(12) United States Patent
Koseki et al.

(10) Patent No.: US 11,599,297 B2
(45) Date of Patent: Mar. 7, 2023

(54) STORAGE APPARATUS, MAINTENANCE SUPPORT METHOD, AND MAINTENANCE SUPPORT PROGRAM

(71) Applicant: Hitachi, Ltd., Tokyo (JP)

(72) Inventors: Hideyuki Koseki, Tokyo (JP); Hiroki Fujii, Tokyo (JP); Akira Deguchi, Tokyo (JP); Akira Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/477,308

(22) Filed: Sep. 16, 2021

(65) Prior Publication Data

US 2022/0236882 A1    Jul. 28, 2022

(30) Foreign Application Priority Data

Jan. 27, 2021   (JP) .............................. JP2021-011019

(51) Int. Cl.
| | | |
|---|---|---|
| *G06F 11/07* | (2006.01) | |
| *G06F 3/06* | (2006.01) | |
| *G06F 11/10* | (2006.01) | |

(52) U.S. Cl.
CPC ............ *G06F 3/065* (2013.01); *G06F 3/0617* (2013.01); *G06F 3/0619* (2013.01); *G06F 3/0679* (2013.01); *G06F 11/0727* (2013.01); *G06F 11/0751* (2013.01); *G06F 11/0772* (2013.01); *G06F 11/1004* (2013.01)

(58) Field of Classification Search
CPC ............ G06F 11/0751; G06F 11/0775; G06F 11/1088; G06F 11/0727; G06F 11/0772; G06F 11/1004
See application file for complete search history.

(56) References Cited

U.S. PATENT DOCUMENTS

| | | | |
|---|---|---|---|
| 10,082,965 B1 * | 9/2018 | Tamilarasan | .......... G06F 3/0616 |
| 10,921,990 B2 * | 2/2021 | Zhang | ................... G06F 3/0616 |
| 2007/0220313 A1 | 9/2007 | Katsuragi et al. | |

FOREIGN PATENT DOCUMENTS

JP          2007-233903 A     9/2007

* cited by examiner

*Primary Examiner* — Nadeem Iqbal
(74) *Attorney, Agent, or Firm* — Procopio, Cory, Hargreaves & Savitch LLP

(57) ABSTRACT

The efficiency of the maintenance of a storage apparatus including a plurality of flash drives can be enhanced.
In a storage apparatus including a plurality of SSDs and a CPU, the CPU specifies, based on lifetimes of the SSDs depending on amounts of data written to the SSDs, the SSD to be replaced on a scheduled maintenance date, gives notice of the SSD specified to be replaced, and copies data in the SSD to be replaced to another SSD by the scheduled maintenance date on which the replacement is to be performed.

9 Claims, 23 Drawing Sheets

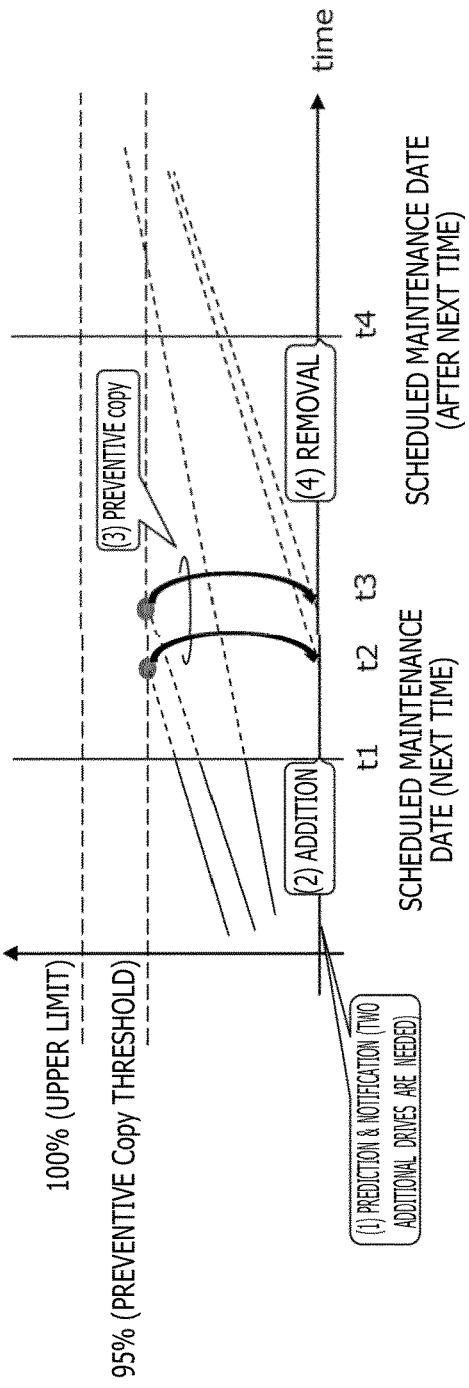
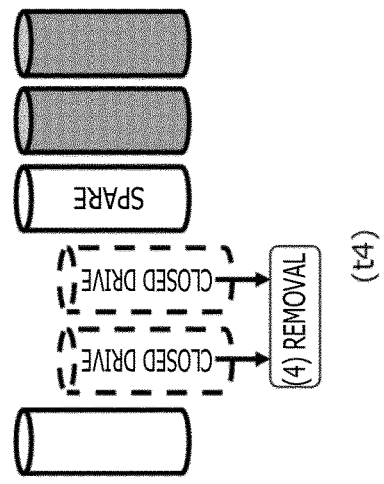
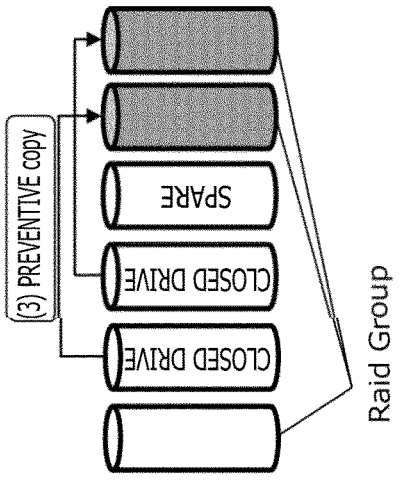
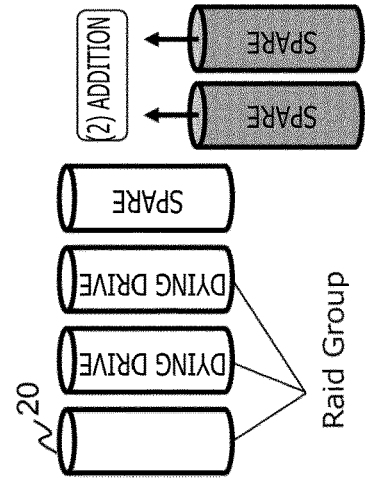

FIG. 6

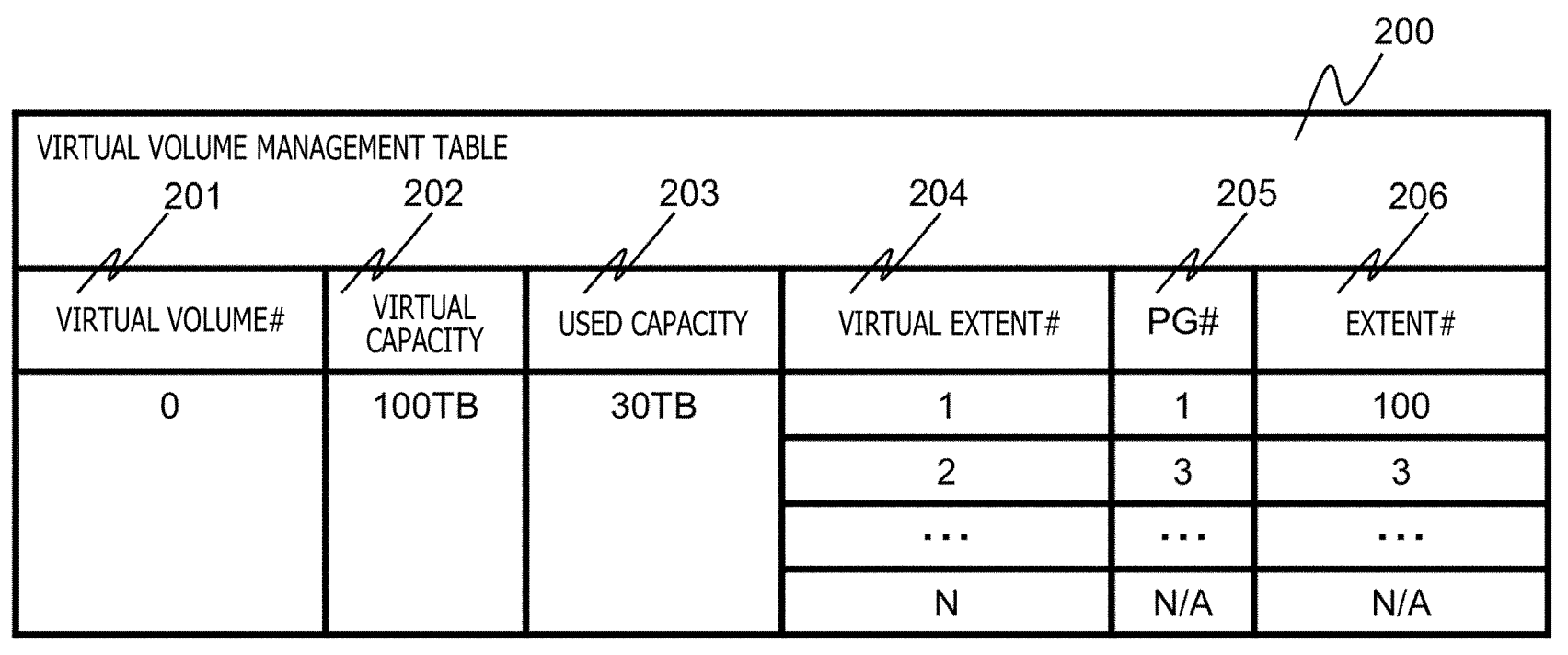

VIRTUAL VOLUME MANAGEMENT TABLE 200

| VIRTUAL VOLUME # 201 | VIRTUAL CAPACITY 202 | USED CAPACITY 203 | VIRTUAL EXTENT # 204 | PG # 205 | EXTENT # 206 |
|---|---|---|---|---|---|
| 0 | 100TB | 30TB | 1 | 1 | 100 |
|   |       |      | 2 | 3 | 3 |
|   |       |      | ... | ... | ... |
|   |       |      | N | N/A | N/A |

FIG. 7

POOL MANAGEMENT TABLE 300

| Pool# 301 | Extent# 302 | PG CONFIGURATION 303 | Entry# 304 | PG# 305 | Drive# 306 | Offset 307 | Size 308 | STATUS 309 |
|---|---|---|---|---|---|---|---|---|
| 0 | 1 | 2D1P | D01 | 1 | 0 | 0 | 256kB | ASSIGNED |
| | | | D02 | | 1 | 0 | 256kB | |
| | | | P01 | | 2 | 0 | 256kB | |
| | 2 | 2D1P | D11 | 1 | 0 | 256kB | 256kB | UNASSIGNED |
| | | | P11 | | 1 | 256kB | 256kB | |
| | | | D12 | | 2 | 256kB | 256kB | |
| | 3 | 2D1P | P21 | 1 | 0 | 512kB | 256kB | ASSIGNED |
| | | | D21 | | 1 | 512kB | 256kB | |
| | | | D22 | | 2 | 512kB | 256kB | |
| ... | ... | ... | ... | ... | ... | ... | ... | ... |

FIG. 8

DRIVE MANAGEMENT TABLE 500

| Drive# 501 | Box# 502 | Offset 503 | Drive type 504 | STATUS 505 | PG# 506 | ATTRIBUTE 507 | WR LIFETIME CONSUMPTION RATE (%) 508 | DRV MODEL NUMBER 509 | PREVENTIVE copy THRESHOLD 510 |
|---|---|---|---|---|---|---|---|---|---|
| 0 | 0 | 0 | SSD | Good | 1 | Data /parity | 50% | SSD_1.6TB_1 | 95% |
| 1 | 0 | 1 | SSD | Good | 1 | Data /parity | 45% | SSD_1.6TB_1 | 95% |
| 2 | 0 | 2 | SSD | failed | - | Spare | 0% | SSD_1.6TB_1 | 95% |
| ... | ... | ... | ... | ... | ... | ... | ... | ... | ... |

FIG. 9

DRIVE STATISTICAL INFORMATION MANAGEMENT TABLE 600

| Drive# 601 | Time Stamp 602 | WR LIFETIME CONSUMPTION RATE 603 | WR LIFETIME CONSUMPTION SPEED 604 |
|---|---|---|---|
| 0 | 2020.01.10.12:00:00 | 0.6% | 0.1% / day |
|  | 2020.01.10.18:00:00 | 6.2% | 0.1% / day |
|  | ... | ... | ... |
|  | 2020.07.20.12:00:00 | 18.7% | N % / day |
|  | ... | ... | ... |
|  | ... | ... | ... |

F I G . 1 0

DRIVE FAILURE LOG MANAGEMENT TABLE — 700

| Time Stamp | DRV # | FAILURE EVENT DETAILS | MEASURE | RECOVERY DESTINATION Drive# |
|---|---|---|---|---|
| 2020.02.10.14:05:21 | #1 | DRIVE FAILURE | CORRECTION | #10 |
| 2020.04.01.10:10:30 | #20 | PREVENTIVE copy THRESHOLD IS EXCEEDED | PREVENTIVE copy | #22 |
| ... | ... | ... | ... | ... |

701 / 702 / 703 / 704 / 705

F I G . 1 1

SSD LIFETIME ESTIMATION TABLE 800

| Drive# 801 | WR LIFETIME CONSUMPTION RATE 802 | WR LIFETIME CONSUMPTION SPEED 803 | SCHEDULED MAINTENANCE DATE AFTER NEXT 804 | REMAINING DAY 805 | ESTIMATED WR LIFETIME CONSUMPTION RATE 806 |
|---|---|---|---|---|---|
| 0 | 50% | 0.1% / day | 2020.10.30 | 100 day | 60% |
| 1 | 80% | 0.3% / day | 2020.10.30 | 100 day | 110% |
| 2 | 43% | 0.2% / day | 2020.10.30 | 100 day | 63% |
| ... | ... | ... | ... | ... | ... |
| n | ... | ... | ... | ... | ... |

FIG.19

POOL MANAGEMENT TABLE 300

| Pool# 301 | Extent# 302 | PG CONFIGURATION 303 | Entry# 304 | PG# 305 | Drive# 306 | Offset 307 | Size 308 | STATUS 309 |
|---|---|---|---|---|---|---|---|---|
| 0 | 1 | 2D1P +1S | D01 | 1 | 0 | 0 | 256kB | ASSIGNED |
| | | | D02 | | 1 | 0 | 256kB | |
| | | | P01 | | 2 | 0 | 256kB | |
| | 2 | 2D1P +1S | D11 | 1 | 0 | 256kB | 256kB | ASSIGNED |
| | | | P11 | | 1 | 256kB | 256kB | |
| | | | D12 | | 2 | 256kB | 256kB | |
| | 3 | 2D1P +1S | S01 | 1 | 0 | 512kB | 256kB | UNASSIGNED |
| | | | S02 | | 1 | 512kB | 256kB | |
| | | | S03 | | 2 | 512kB | 256kB | |
| ... | ... | ... | ... | ... | ... | ... | ... | ... |

STORAGE APPARATUS, MAINTENANCE SUPPORT METHOD, AND MAINTENANCE SUPPORT PROGRAM

BACKGROUND OF THE INVENTION

1. Field of the Invention

The present invention relates to a technology for supporting maintenance of a storage apparatus including a plurality of flash drives.

2. Description of the Related Art

For example, storage apparatuses having mounted thereon flash drives such as solid state drives (SSDs) as storage devices are in widespread use.

A flash drive has an upper limit value on the amount of writable data, that is, has a limited lifetime, and hence, the flash drive needs to be subjected to maintenance and replacement before the flash drive reaches the end of its lifetime. Maintenance and replacement require, for example, the presence of maintenance personnel and apparatus schedule adjustment, which results in burden on the user of the storage apparatus. Thus, there are demands for reductions in occurrence of unexpected maintenance and frequency of maintenance.

For example, JP-2007-233903-A discloses a technology for copying data to a spare drive on the basis of the number of errors.

SUMMARY OF THE INVENTION

For example, in a case where a spare drive is used, there is a need to perform maintenance at a location where a storage apparatus is installed (actual place) to refill the spare drive. In the case where a spare drive is used, maintenance is performed basically every time a failure occurs, to quickly handle the failures. Further, even if the maintenance of the spare drive has just been performed, spare drive maintenance is needed again if the spare drive is used again, and hence, there is a risk that the efficiency of maintenance becomes poor.

The present invention has been made in view of the above-mentioned circumstances, and has an object to provide a technology that makes it possible to enhance efficiency of the maintenance of a storage apparatus including a plurality of flash drives.

In order to achieve the above-mentioned object, according to an aspect, there is provided a storage apparatus including a plurality of flash drives and a processor, in which the processor is configured to specify, based on lifetimes of the flash drives depending on amounts of data written to the flash drives, a flash drive to be replaced on a scheduled maintenance date, give notice of the flash drive specified to be replaced, and copy data in the flash drive to be replaced to another flash drive by the scheduled maintenance date on which the replacement is to be performed.

According to the present invention, the efficiency of the maintenance of the storage apparatus including the plurality of flash drives can be enhanced.

BRIEF DESCRIPTION OF THE DRAWINGS

FIGS. 1A-1D depict diagrams illustrating outlines of a first embodiment;

FIG. 6 is a configuration diagram of a virtual volume management table according to the first embodiment;

FIG. 7 is a configuration diagram of a pool management table according to the first embodiment;

FIG. 8 is a configuration diagram of a drive management table according to the first embodiment;

FIG. 9 is a configuration diagram of a drive statistical information management table according to the first embodiment;

FIG. 10 is a configuration diagram of a drive failure log management table according to the first embodiment;

FIG. 11 is a configuration diagram of an SSD lifetime estimation table according to the first embodiment;

FIG. 19 is a configuration diagram of a pool management table according to the second embodiment;

DESCRIPTION OF THE PREFERRED EMBODIMENTS

Figure 2:
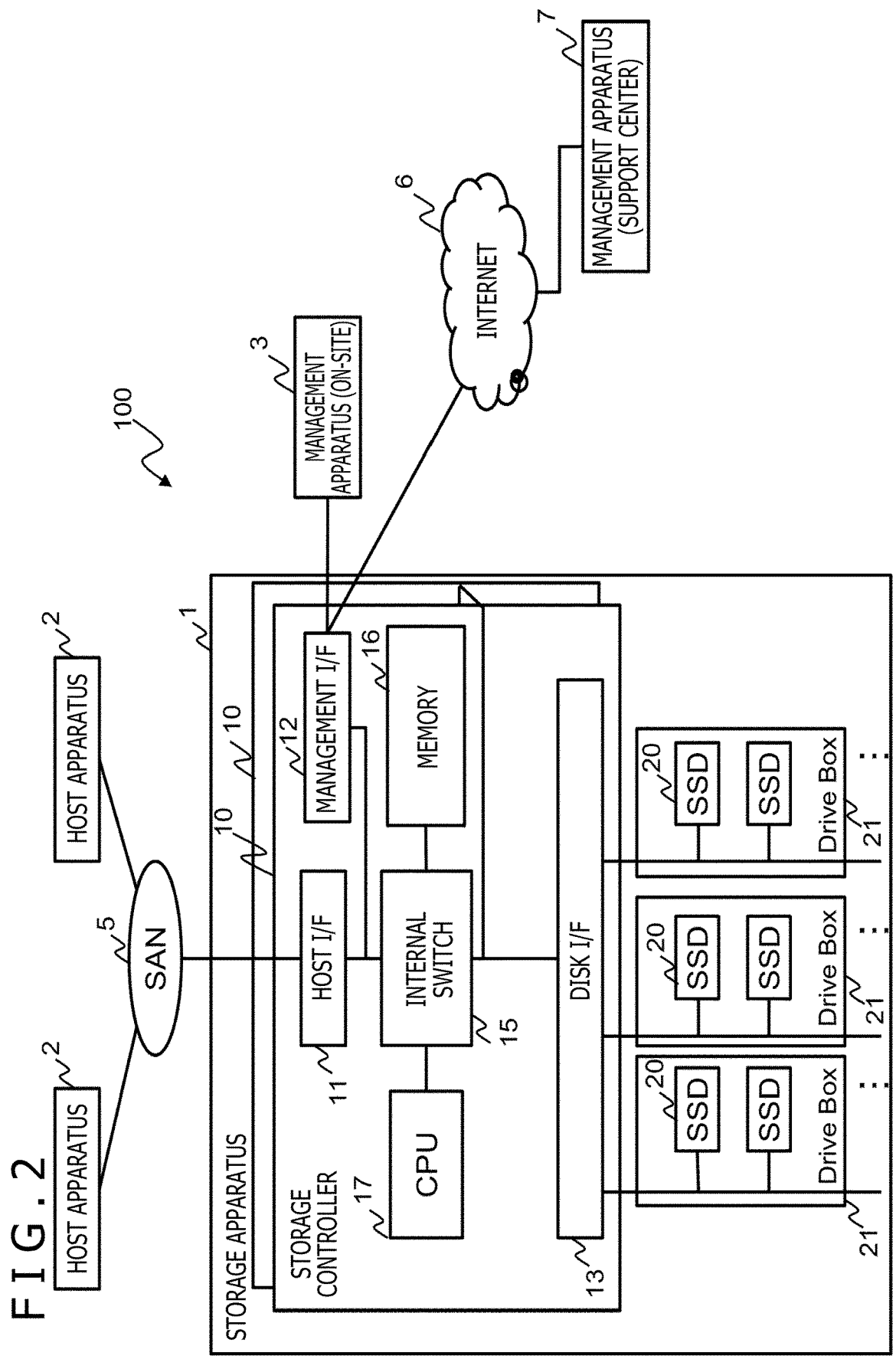
FIG. 2 is an overall configuration diagram of a maintenance support system according to the first embodiment.

Embodiments are described with reference to the drawings. Note that, the embodiments described below are not intended to limit the invention as set forth in the appended claims, and all elements and combinations thereof described in the embodiments are not necessarily essential to solutions proposed by the invention.

Although information is sometimes described using an expression "AAA table" in the following description, the information may be expressed using any kind of data structure. That is, "AAA table" can also be referred to as "AAA information" in order to indicate that the information is independent of data structure.

First, the outline of a first embodiment is described.

FIG. 1 depicts diagrams illustrating the outline of the first embodiment. FIG. 1A is a diagram illustrating the variation with time of a WR lifetime consumption rate of each SSD (drive) in a storage apparatus. FIG. 1B is a diagram illustrating processing at time t1, FIG. 1C is a diagram illustrating processing at time t2 and time t3, and FIG. 1D is a diagram illustrating processing at time t4.

As illustrated in FIG. 1A, the WR lifetime consumption rate of each SSD 20 (see FIG. 2) of a storage apparatus 1 (see FIG. 2) gradually increases over time. Here, the WR lifetime consumption rate indicates the ratio of the amount of data written to the SSD 20 to the writable amount upper limit value of the SSD 20.

With regard to the storage apparatus 1, the time t1 corresponds to the next scheduled maintenance date, and the time t4 corresponds to the scheduled maintenance date after next.

The storage apparatus 1 projects, before the next scheduled maintenance date (time t1), the number of the dying SSDs 20 that need to be replaced by the scheduled maintenance date after next (time t4). Specifically, the storage apparatus 1 projects the WR lifetime consumption rate of each of the SSDs 20 as of the scheduled maintenance date after next, and determines whether the projected WR lifetime consumption rate exceeds a predetermined preventive Copy threshold (for example, 95%) or not, to thereby determine the SSD 20 whose WR lifetime consumption rate exceeds the preventive Copy threshold as the dying SSD 20 that needs to be replaced. Next, the storage apparatus 1 notifies the maintenance personnel of the projected number of the SSDs 20 ((1) of FIG. 1). In this example, it is determined that the two additional SSDs 20 are needed, for example.

After that, on the next scheduled maintenance date, that is, at the time t1, the maintenance personnel prepare the notified number of the SSDs 20, and visits the location where the storage apparatus 1 is installed (actual place), to add, as spares, the prepared SSDs 20 to the empty drive slots of the storage apparatus 1 ((2) of FIG. 1), as illustrated in FIG. 1B.

Next, the storage apparatus 1 performs, at time points at which the WR lifetime consumption rates of the SSDs 20 exceed the preventive Copy threshold as illustrated in FIG. 1A (times t2 and t3), preventive copy on the dying SSDs 20 ((3) of FIG. 1) as illustrated in FIG. 1C. That is, the storage apparatus 1 copies the data in the dying SSDs 20 to the SSDs 20 added at the time t1 and closes the dying SSDs 20.

Next, on the scheduled maintenance date after next, that is, at the time t4, as illustrated in FIG. 1D, the maintenance personnel remove the closed SSDs 20 from the storage apparatus 1 ((4) of FIG. 1).

With the storage apparatus 1 according to the present embodiment, the number of the SSDs 20 notified in advance are prepared and then added to the storage apparatus 1 on the next scheduled maintenance date and the SSDs 20 are removed from the storage apparatus 1 on the scheduled maintenance date after next, in short, maintenance is performed on the predetermined scheduled maintenance dates, which are determined in advance, with the result that the dying SSDs 20 that need to be replaced can be efficiently replaced, so that the occurrence of maintenance other than that on the scheduled maintenance dates determined in advance can be appropriately reduced.

Next, a maintenance support system according to the first embodiment is described in detail.

FIG. 2 is an overall configuration diagram of the maintenance support system according to the first embodiment.

A maintenance support system 100 includes the storage apparatus 1, one or more host apparatuses 2, a management apparatus 3, and a management apparatus 7.

The storage apparatus 1 and the host apparatus 2 are connected to each other via, for example, a storage area network (SAN) 5, which is an example of a network. Further, the storage apparatus 1 and the management apparatus 3 are connected to each other via a cable, for example. Further, the storage apparatus 1 and the management apparatus 7 are connected to each other via, for example, an Internet 6, which is an example of a network.

The host apparatus 2 executes various types of processing to read/write data from/to the storage apparatus 1.

The management apparatus 3 is, for example, a computer that is used by the maintenance personnel (storage administrator) at the company owing the storage apparatus 1, and receives various notifications from the storage apparatus 1 and displays the notification content, for example. The management apparatus 7 is, for example, a computer that is used by the maintenance personnel at the company in charge of supporting the maintenance of the storage apparatus 1, and receives various notifications from the storage apparatus 1 and displays the notification content, for example.

The storage apparatus 1 stores various types of data and executes various types of processing for data management (the main processing of drive maintenance support described later and the like). The storage apparatus 1 includes a plurality of storage controllers 10 and a plurality of drive boxes 21.

The drive box 21 has slots into which a plurality of drives (for example, the SSDs 20 that are examples of flash drives) are insertable (drive slots). In the present embodiment, the plurality of SSDs 20 are mounted in the plurality of drive boxes 21. Note that, the SSD 20 may not be inserted into some of the drive slots of the drive box 21.

The storage controller 10 includes a host interface (I/F) 11, a management I/F 12, a disk I/F 13, an internal switch 15, a memory 16, and a central processing unit (CPU) 17, which is an example of a processor. The host I/F 11, the management I/F 12, the disk I/F 13, the memory 16, and the CPU 17 are connected to each other in a communicable manner via the internal switch 15.

The host I/F 11 is an interface for communication with the host apparatus 2 via the SAN 5. The management I/F 12 is an interface for communication with the management apparatus 3 or 7 or the like via the cable or the Internet 6. The disk I/F 13 is an interface for communication with the SSD 20.

The CPU 17 executes various types of processing in accordance with a program stored in the memory 16 and/or the SSD 20.

The memory 16 is, for example, a random access memory (RAM) and stores a program to be executed by the CPU 17 and necessary information. The memory 16 stores, for example, a program for executing the main processing described later (example of a maintenance support program), a virtual volume management table 200 (see FIG. 6), a pool management table 300 (see FIG. 7), a drive management table 500 (see FIG. 8), a drive statistical information management table 600 (see FIG. 9), a drive failure log management table 700 (see FIG. 10), and an SSD lifetime estimation table 800 (see FIG. 11).

Next, the configuration of a volume that the storage apparatus 1 provides to the host apparatus 2 is described.

Figure 3:
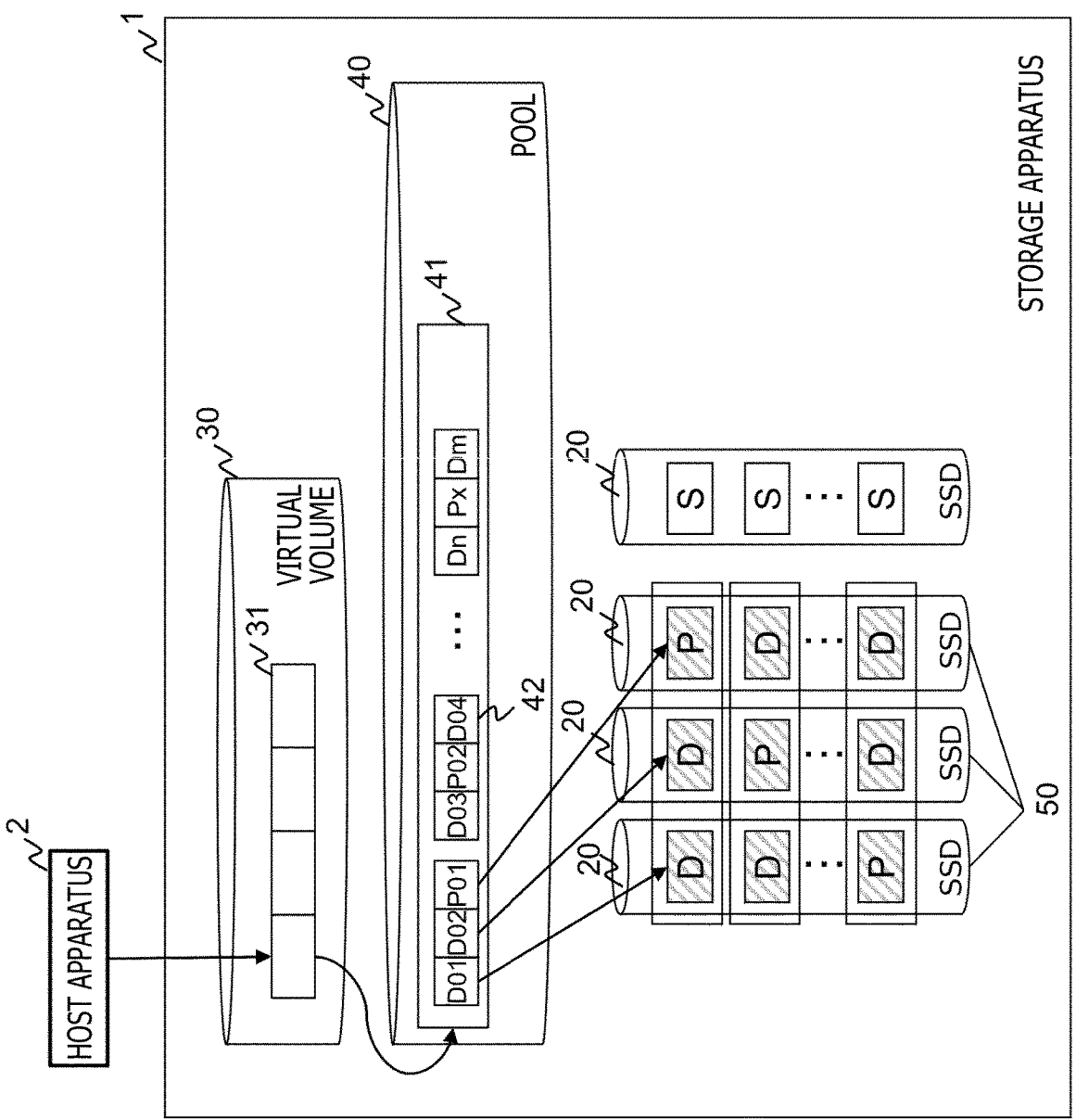
FIG. 3 is a configuration diagram of a volume that is managed by a storage apparatus according to the first embodiment.

FIG. 3 is a configuration diagram of a volume that is managed by the storage apparatus according to the first embodiment.

The storage apparatus 1 includes one or more parity groups (PGs) 50 each including the plurality of SSDs 20 for data redundancy. The PG 50 may be a redundant array of independent (or inexpensive) disks (RAID) group. In the example of FIG. 3, the PG 50 has the 2D1P configuration including the three SSDs 20. The storage apparatus 1 also includes the SSD 20 that is used as a spare not belonging to the PG 50.

The storage apparatus 1 has a capacity virtualization function and provides a virtual volume 30 to the host apparatus 2. The virtual volume 30 includes a plurality of virtual extents 31.

The storage apparatus 1 has a pool 40 including the storage area of the PG 50. The storage area of the pool 40 is assigned to the virtual extent 31 in units of an extent 41.

The extent 41 corresponds to the storage area of the PG 50 and includes a plurality of entries 42 for storing data having a predetermined size (data unit) and parity.

Next, usage examples of the spare area of the SSD 20 in the storage apparatus 1 are described.

Figure 4:
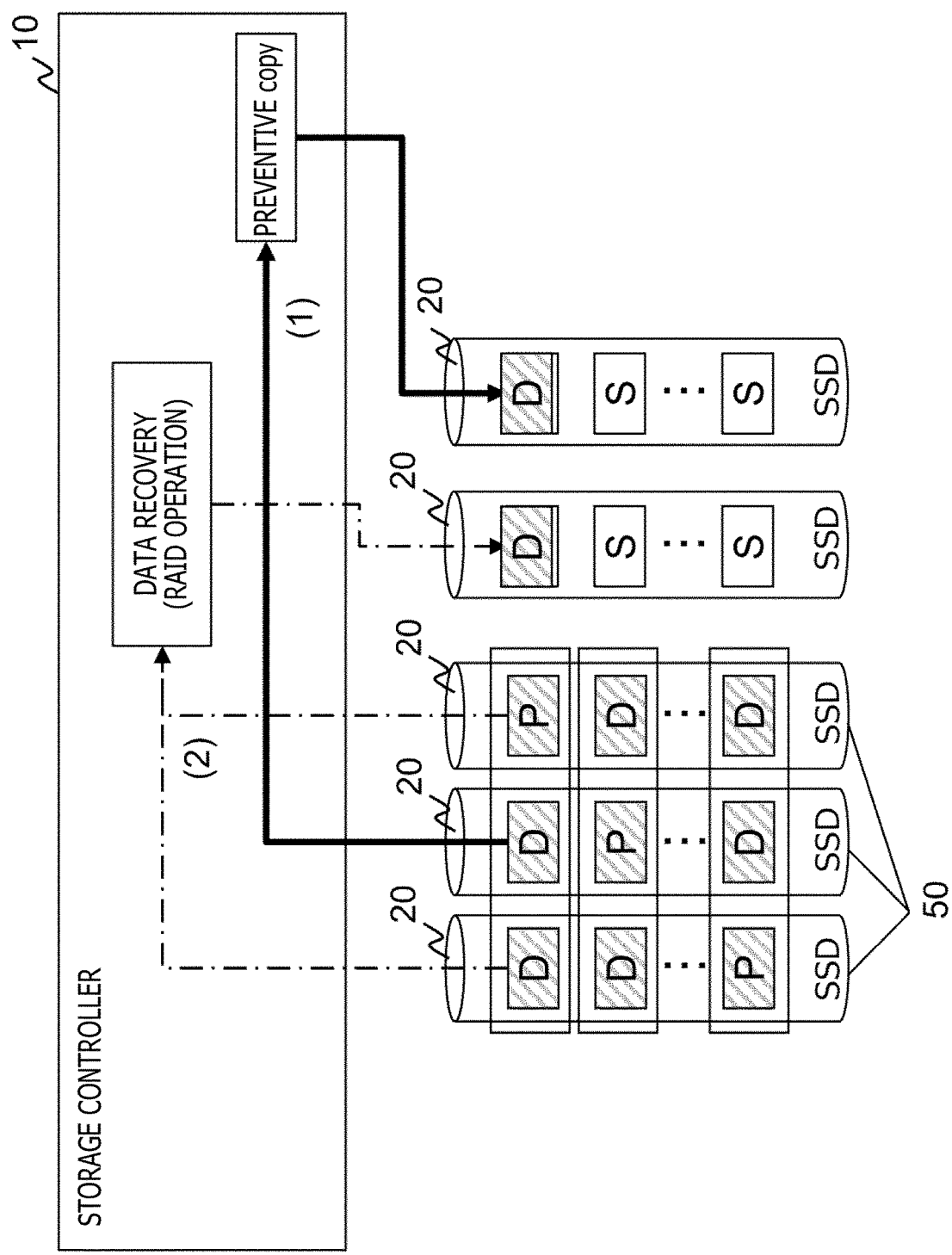
FIG. 4 is a diagram illustrating usage examples of a spare area according to the first embodiment.

FIG. 4 is a diagram illustrating the usage examples of the spare area according to the first embodiment.

The storage apparatus 1 uses the storage area of the spare SSD 20 (spare area) at a time point at which the SSD 20 is dying or a time point at which a failure such as an unexpected failure occurs in the SSD 20.

For example, at the time point at which the SSD 20 (the second SSD 20 from the left in FIG. 4) is dying, as indicated by (1) of FIG. 4, the data in the dying SSD 20 is copied to the storage area of the spare SSD 20. Here, copying data in this way is called "preventive copy." In preventive copy, all the data in the dying SSD 20 is copied to the spare SSD 20.

Meanwhile, at the time point at which a failure such as an unexpected failure occurs in the SSD 20 (the second SSD 20 from the left in FIG. 4), as indicated by (2) of FIG. 4, the data in the failed SSD 20 is recovered with the use of the data and parity in the other SSDs 20 of the PG 50 and copied to the storage area of the spare SSD 20. Here, copying data in this way is called "correction copy." In correction copy, depending on the condition of a failure, only corrupted data may be copied, the data in some parts of the SSD 20 may be copied, or all the data in the SSD 20 may be copied.

Next, an address management method for the storage apparatus 1 is described.

Figure 5:
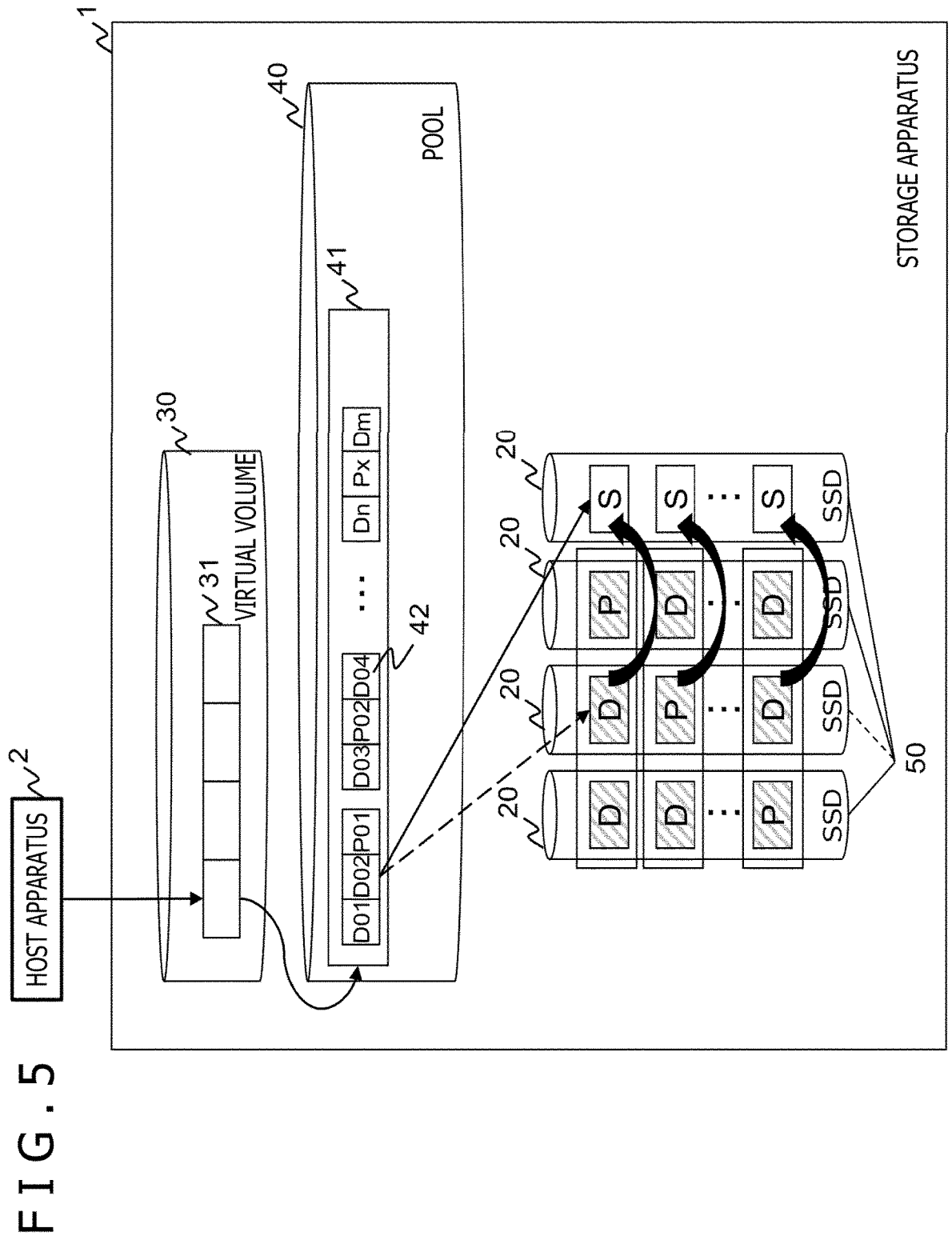
FIG. 5 is a diagram illustrating an address management method for the storage apparatus according to the first embodiment.

FIG. 5 is a diagram illustrating the address management method for the storage apparatus according to the first embodiment.

In the storage apparatus 1, the entry 42 included in the extent 41 of the pool 40 is associated with the address space of the SSD 20. Specifically, the entry 42 and the address space of the SSD 20 are managed by the pool management table 300.

Here, when data is copied to be moved as illustrated in FIG. 4, the storage controller 10 of the storage apparatus 1 changes the correspondence between the entry 42 and the address space of the SSD 20 to a post-copy correspondence. For example, when preventive copy is performed or when correction copy is performed in terms of all the data in the SSD 20, the storage controller 10 performs setting of changing the SSD 20 to be changed among the SSDs 20 of the PG 50 to the spare SSD 20. Specifically, the storage controller 10 changes the setting to make the spare SSD 20 belong to the PG 50 in the pool management table 300 and the drive management table 500.

Next, various types of data that are stored in the memory 16 of the storage apparatus 1 are described in detail.

FIG. 6 is a configuration diagram of the virtual volume management table according to the first embodiment.

The virtual volume management table 200 is a table for managing the virtual volume 30 and manages the correspondence between the virtual space (virtual volume 30 and virtual extent 31) and the real space (PG 50 and extent 41). The virtual volume management table 200 stores the record of each of the virtual volumes 30. The record in the virtual volume management table 200 has the following fields: virtual volume #201, virtual capacity 202, used capacity 203, virtual extent #204, PG #205, and extent #206.

In the virtual volume #201, a number for identifying the virtual volume 30 corresponding to a record (virtual volume number) is stored. In the virtual capacity 202, the virtual capacity of the virtual volume 30 corresponding to the record is stored. In the used capacity 203, a capacity used by the virtual volume 30 corresponding to the record (used capacity) is stored. In the virtual extent #204, a number for identifying the virtual extent 31 included in the virtual volume 30 corresponding to the record (virtual extent number) is stored. In the PG #205, a number for identifying the PG 50 to which the extent 41 corresponding to the virtual extent 31 corresponding to the record belongs (PG number) is stored. In the extent #206, a number for identifying the extent 41 assigned to the virtual extent 31 corresponding to the record (extent number) is stored.

FIG. 7 is a configuration diagram of the pool management table according to the first embodiment.

The pool management table 300 is a table for managing the real space in the pool 40, that is, the address space of the drive (in this example, SSD 20) corresponding to the extent 41, and stores the record of each of the pools 40. The record in the pool management table 300 has the following fields: Pool #301, Extent #302, PG configuration 303, Entry #304, PG #305, Drive #306, Offset 307, Size 308, and status 309.

In the Pool #301, a number for identifying the pool 40 corresponding to a record (pool number) is stored. In the Extent #302, the extent number of the one or more extents 41 corresponding to the record is stored. In the PG configuration 303, the configuration of the PG 50 of the extent 41 corresponding to the record (PG configuration) is stored. As the PG configuration, the number of data areas (D) and the number of parity areas (P) are expressed. For example, a configuration having a single parity area for two data areas has 2D1P in the PG configuration. In the Entry #304, a number for identifying the one or more entries 42 included in the extent 41 corresponding to the record (entry number) is stored. In the PG #305, a number for identifying the PG 50 included in the extent 41 corresponding to the entry 42 in the record (PG number) is stored.

In the Drive #306, a number for identifying the drive (SSD 20) that provides the entry 42 in the record (drive number) is stored. In the Offset 307, the offset of the area corresponding to the entry 42 in the record is stored. In the Size 308, the size of the area of the entry 42 in the record is stored. In the status 309, the status of the extent 41 corresponding to the record is stored. As the status of the extent 41, "assigned" indicating that the extent 41 has been assigned to the virtual extent 31 or "unassigned" indicating that the extent 41 has not been assigned to the virtual extent 31 is given.

FIG. 8 is a configuration diagram of the drive management table according to the first embodiment.

The drive management table 500 is a table for managing the drive (SSD 20 or the like) and stores the record of each drive. The record in the drive management table 500 has the following fields: Drive #501, Box #502, Offset 503, Drive type 504, status 505, PG #506, attribute 507, WR lifetime consumption rate 508, DRV model number 509, and preventive Copy threshold 510.

In the Drive #501, the drive number of the drive (SSD 20) corresponding to a record is stored. In the Box #502, a number for identifying the drive box 21 including the drive corresponding to the record (Box number) is stored. In the Offset 503, an offset in the drive box 21 including the drive corresponding to the record is stored. In the Drive type 504, the type of the drive corresponding to the record is stored. In the status 505, the status of the drive corresponding to the record is stored. As the status of the drive, "Good" indicating that the drive is normal or "failed" indicating that the drive is in the failed status is given.

In the PG #506, the PG number of the PG 50 to which the drive corresponding to the record belongs is stored. In the attribute 507, the attribute of the drive corresponding to the record is stored. As the attribute of the drive, "Data/parity" indicating that the drive stores data and parity or "Spare" indicating that the drive is a reserve (spare) drive is given. In the WR lifetime consumption rate 508, the WR lifetime consumption rate of the drive corresponding to the record is stored. In the DRV model number 509, the model number of the drive corresponding to the record is stored. In the preventive Copy threshold 510, a preventive Copy threshold for the drive corresponding to the record is stored. The preventive Copy threshold is a threshold for determining the necessity of the replacement of the SSD 20 and whether to execute preventive copy, which is described later. Note that, in the present embodiment, the same preventive Copy threshold is applied to the drives, but the preventive Copy threshold may be different between the drives.

FIG. 9 is a configuration diagram of the drive statistical information management table according to the first embodiment.

The drive statistical information management table 600 is a table provided for each drive (in this example, SSD 20), for managing statistical information regarding the WR lifetime consumption rate of the drive. The drive statistical information management table 600 has the following fields: Drive #601, Time Stamp 602, WR lifetime consumption rate 603, and WR lifetime consumption speed 604. In the Drive #601, the drive number of the drive corresponding to the table is stored. In the Time Stamp 602, the date and time on which the corresponding information has been acquired is stored. In the WR lifetime consumption rate 603, the WR lifetime consumption rate of the drive corresponding to the table, the WR lifetime consumption rate being based on the WR written amount on the corresponding date and time, is stored. The WR lifetime consumption rate is managed inside the SSD 20, for example, and can be acquired from the corresponding SSD 20. In the WR lifetime consumption speed 604, the increase speed of the WR lifetime consumption rate of the drive corresponding to the table on the corresponding date and time (WR lifetime consumption speed) is stored. In the present embodiment, the WR lifetime consumption speed is, for example, the increase speed of the WR lifetime consumption rate per day in the period corresponding to the corresponding date and time.

FIG. 10 is a configuration diagram of the drive failure log management table according to the first embodiment.

The drive failure log management table 700 is a table for managing a failure event occurred in the drive and stores the record of each failure event. The record in the drive failure log management table 700 has the following fields: Time Stamp 701, DRV #702, failure event details 703, measure 704, and recovery destination Drive #705.

In the Time Stamp 701, the date and time on which the failure event corresponding to a record has occurred is stored. In the DRV #702, the drive number of the drive in which the failure event corresponding to the record has occurred is stored. In the failure event details 703, the details of the failure event corresponding to the record are stored. In the measure 704, the measure against the failure event corresponding to the record is stored. In the recovery destination Drive #705, the drive number of the drive in which the data has been recovered by the measure against the failure event corresponding to the record is stored.

FIG. 11 is a configuration diagram of the SSD lifetime estimation table according to the first embodiment.

The SSD lifetime estimation table 800 is a table for managing the projected value of the WR lifetime consumption rate of each drive on the scheduled maintenance date after next (estimated WR lifetime consumption rate), and stores the record of each of the SSDs 20. The record in the SSD lifetime estimation table 800 has the following fields: Drive #801, WR lifetime consumption rate 802, WR lifetime consumption speed 803, scheduled maintenance date after next 804, remaining day 805, and estimated WR lifetime consumption rate 806.

In the Drive #801, the drive number of the SSD 20 corresponding to a record is stored. In the WR lifetime consumption rate 802, the current WR lifetime consumption rate of the SSD 20 corresponding to the record, that is, the latest WR lifetime consumption rate in the drive statistical information management table 600 in this example, is stored. In the WR lifetime consumption speed 803, the current WR lifetime consumption speed of the SSD 20 corresponding to the record, that is, the latest WR lifetime consumption speed in the drive statistical information management table 600 in this example, is stored. In the scheduled maintenance date after next 804, the scheduled maintenance date after next is stored. In the remaining day 805, the number of days left until the scheduled maintenance date after next is stored. In the estimated WR lifetime consumption rate 806, the estimated WR lifetime consumption rate on the scheduled maintenance date after next of the SSD 20 corresponding to the record is stored.

Next, a method of calculating an estimated WR lifetime consumption rate is described in detail.

Figure 12:
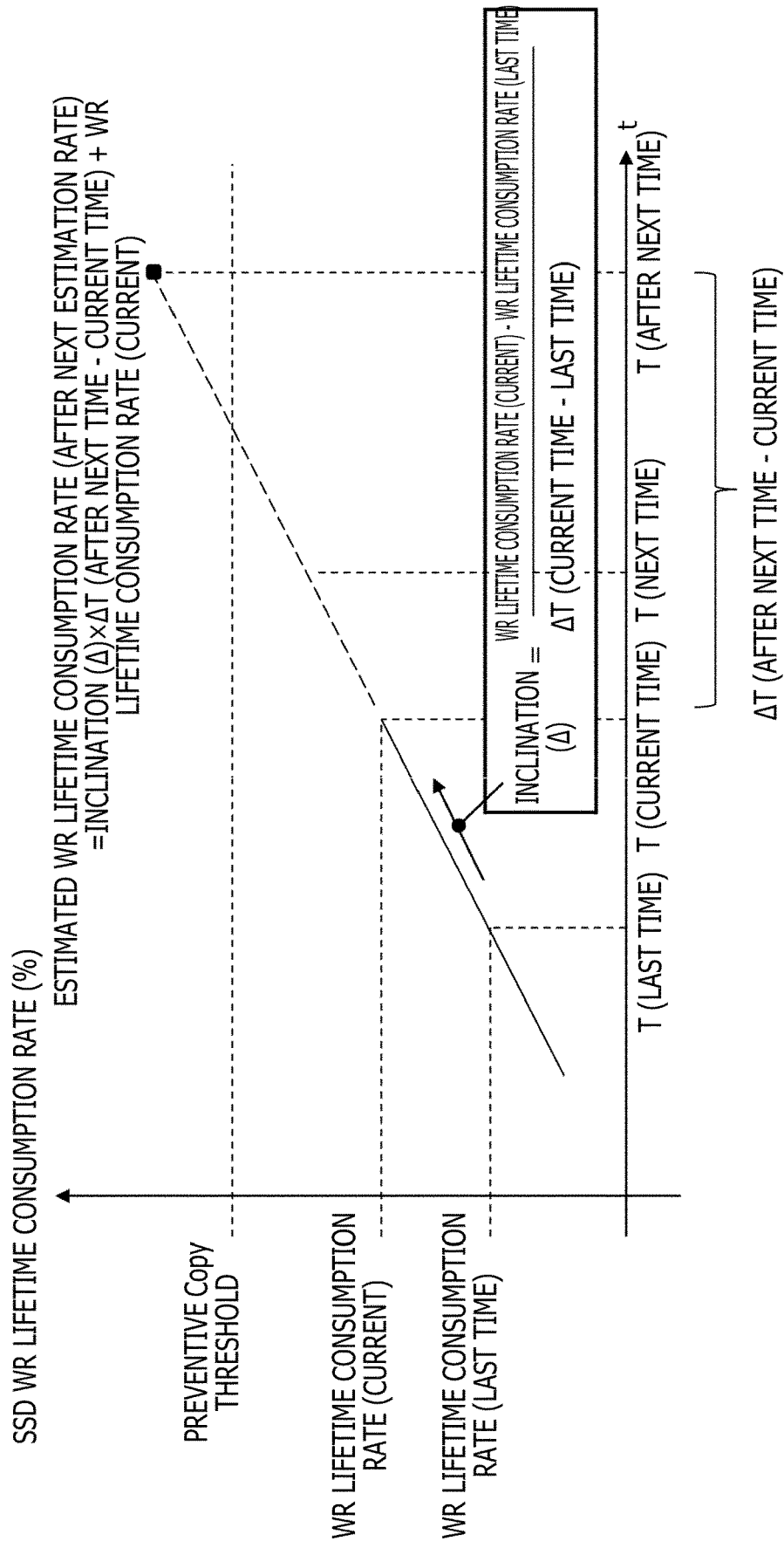
FIG. 12 is a diagram illustrating a method of calculating an estimated write (WR) lifetime consumption rate according to the first embodiment.

FIG. 12 is a diagram illustrating the method of calculating an estimated WR lifetime consumption rate according to the first embodiment.

An estimated WR lifetime consumption rate is calculated by linear approximation. Specifically, an estimated WR lifetime consumption rate is calculated by the following Expression (1), for example.

$$\text{Estimated } WR \text{ lifetime consumption rate} = \text{inclination } (\Delta) \times \Delta T(\text{after next time} - \text{current time}) + WR \text{ lifetime consumption rate (current time)} \quad (1)$$

Here, the inclination ($\Delta$) represents an inclination between T (last time) and T (current time) illustrated in FIG. 12, and can be obtained by (current WR lifetime consumption rate−last WR lifetime consumption rate)/$\Delta T$ (current time−last time).

Next, the main processing is described.

Figure 13:
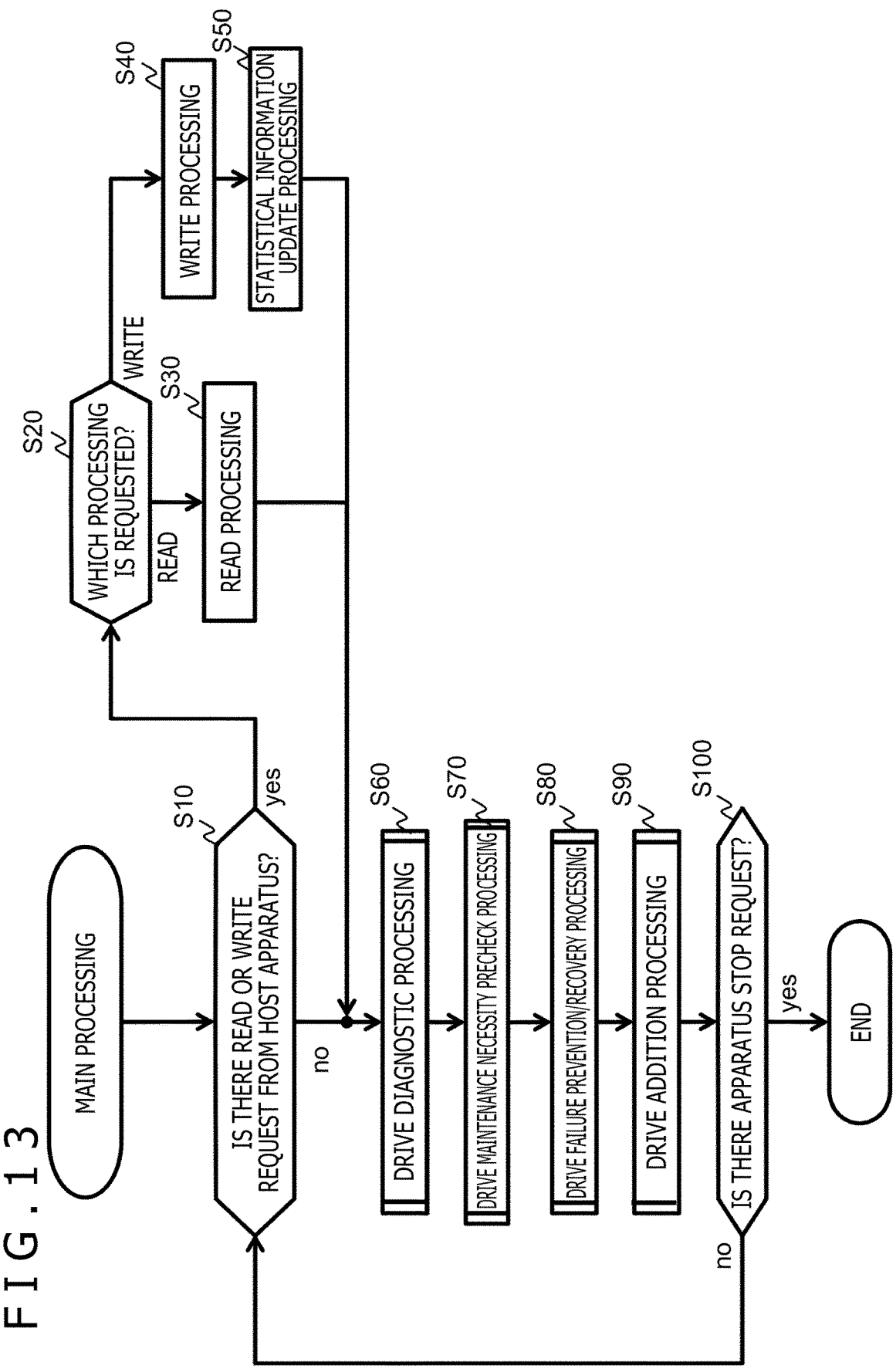
FIG. 13 is a flowchart of main processing according to the first embodiment.

FIG. 13 is a flowchart of the main processing according to the first embodiment.

The main processing is processing that is executed when the storage apparatus 1 starts and the storage controller 10 executes the maintenance support program.

The storage controller 10 determines whether there is a read or write request from the host apparatus 2 or not (Step S10).

In a case where it is determined that there is no read or write request from the host apparatus 2 as a result of the determination (Step S10: no), the storage controller 10 advances the processing to Step S60. In a case where it is determined that there is a read or write request from the host apparatus 2 (Step S10: yes), on the other hand, the storage controller 10 determines whether the requested processing is read or write (Step S20).

In a case where it is determined that the requested processing is read as a result of the determination (Step S20: read), the storage controller 10 performs read processing of reading data corresponding to the requested processing from the corresponding SSD 20 and transmitting the data to the host apparatus 2 (Step S30), and advances the processing to Step S60. In a case where it is determined that the requested processing is write (Step S20: write), on the other hand, the storage controller 10 performs write processing of writing data corresponding to the requested processing to the corresponding SSD 20 (Step S40). The storage controller 10 executes statistical information update processing of updating the drive statistical information management table 600 corresponding to the SSD 20 having the data written thereto (Step S50), and advances the processing to Step S60. In the statistical information update processing, for example, information that is managed by the drive statistical information management table 600 is acquired from the SSD 20.

Figure 14:
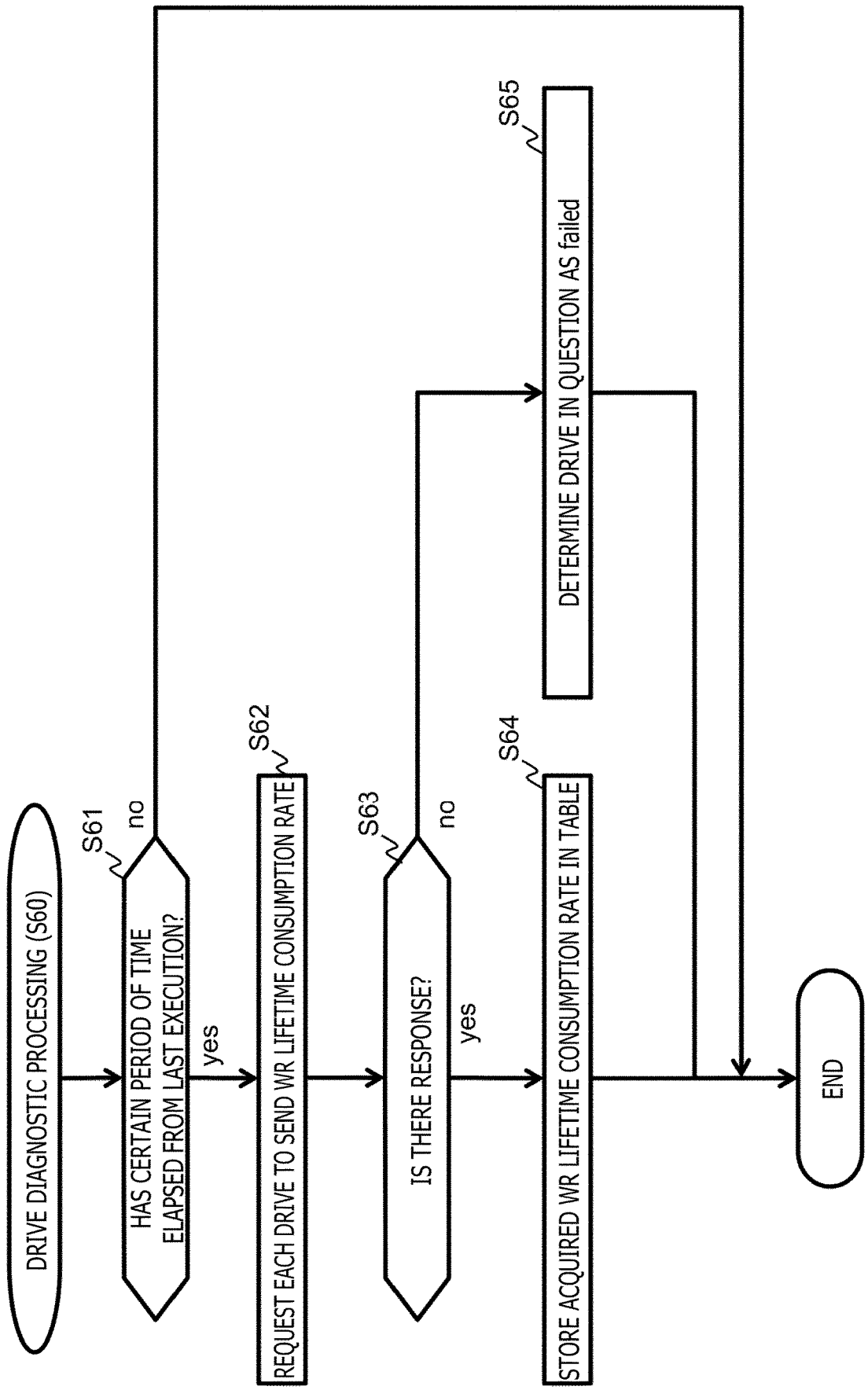
FIG. 14 is a flowchart of drive diagnostic processing according to the first embodiment.

In Step S60, the storage controller 10 executes drive diagnostic processing of diagnosing the status of the drive (see FIG. 14).

Next, the storage controller 10 executes drive maintenance necessity precheck processing of checking whether the maintenance of the drive is needed or not (see FIG. 15) (Step S70).

Then, the storage controller 10 executes drive failure prevention/recovery processing of performing drive failure prevention processing or drive recovery processing (see FIG. 16) (Step S80).

Subsequently, the storage controller 10 executes drive addition processing of recognizing the added SSD 20 and setting information regarding the added SSD 20 for the drive management table 500 and the like (Step S90).

Thereafter, the storage controller 10 determines whether there is a stop request for the storage apparatus 1 or not (Step S100). In a case where it is determined that there is no stop request (Step S6100: no), the storage controller 10 advances the processing to Step S10. In a case where it is determined that there is a stop request (Step S100: yes), on the other hand, the storage controller 10 ends the main processing.

Then, the drive diagnostic processing (Step S60) is described in detail.

FIG. 14 is a flowchart of the drive diagnostic processing according to the first embodiment.

The storage controller 10 determines whether a certain period of time has elapsed from the last drive diagnostic processing or not (Step S61). In a case where it is determined that the certain period of time has not elapsed as a result of the determination (Step S61: no), the storage controller 10 ends the drive diagnostic processing. In a case where it is determined that the certain period of time has elapsed (Step S61: yes), on the other hand, the storage controller 10 requests each of the SSDs 20 to send its WR lifetime consumption rate (Step S62).

Next, the storage controller 10 determines whether there is a response to the send request or not (Step S63). In a case where it is determined that there is a response (Step S63: yes), the storage controller 10 stores the WR lifetime consumption rate in the acquired response in the record of the corresponding drive in the drive management table 500 (Step S64), and ends the drive diagnostic processing.

In a case where it is determined that there is no response (Step S63: no), on the other hand, since the SSD 20 is out of order, the storage controller 10 sets the status of the corresponding drive in the drive management table 500 to failed (Step S65), and ends the drive diagnostic processing.

Next, the drive maintenance necessity precheck processing (Step S70) is described in detail.

Figure 15:
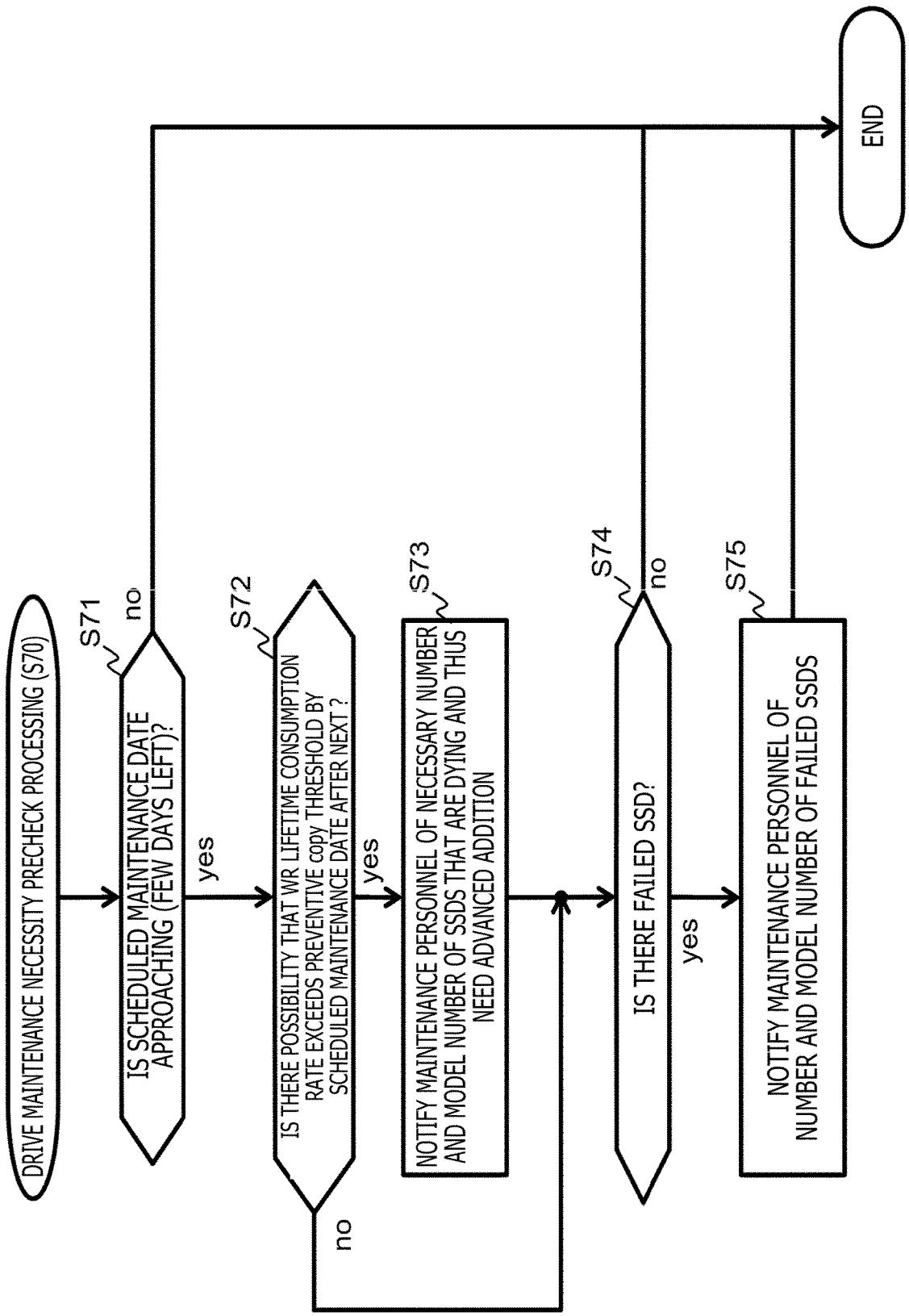
FIG. 15 is a flowchart of drive maintenance necessity precheck processing according to the first embodiment.

FIG. 15 is a flowchart of the drive maintenance necessity precheck processing according to the first embodiment.

The storage controller 10 determines whether the next scheduled maintenance date is approaching (for example, a predetermined number of days are left) or not (Step S71). In a case where it is determined that the next scheduled maintenance date is not approaching (Step S71: no), the storage controller 10 ends the drive maintenance necessity precheck processing.

In a case where it is determined that the next scheduled maintenance date is approaching (Step S71: yes), on the other hand, the storage controller 10 determines whether there is a possibility that the WR lifetime consumption rate exceeds the preventive Copy threshold by the scheduled maintenance date after next or not (Step S72). Specifically, the storage controller 10 estimates, on the basis of the current WR lifetime consumption rate and WR lifetime consumption speed, a WR lifetime consumption rate on the scheduled maintenance date after next, and determines, when the estimated WR lifetime consumption rate exceeds the preventive Copy threshold, that there is a possibility that the WR lifetime consumption rate exceeds the preventive Copy threshold by the scheduled maintenance date after next.

In a case where it is determined that there is no possibility that the WR lifetime consumption rate exceeds the preventive Copy threshold by the scheduled maintenance date after next as a result of the determination (Step S72: no), the storage controller 10 advances the processing to Step S74. In a case where it is determined that there is a possibility that the WR lifetime consumption rate exceeds the preventive Copy threshold (Step S72: yes), on the other hand, the storage controller 10 specifies the number of the dying SSDs 20 that need advanced addition, notifies the management apparatus 3 and/or the management apparatus 7 of the number and model number of the SSDs 20 (Step S73), and advances the processing to Step S74. Note that, the management apparatus 3 or 7 that has been notified of the number and model number of the SSDs 20 displays the necessary number and model number of the SSDs 20 to notify the maintenance personnel of the information, for example. With this, the maintenance personnel can appropriately be notified of the number of the SSDs 20 for dying SSD replacement, so that the necessary number of the SSDs 20 can be added on the next maintenance date.

In Step S74, the storage controller 10 determines whether there is the failed SSD 20 or not. Here, whether the SSD 20 is failed or not may be determined from the number of errors occurred in reading or writing, for example.

In a case where it is determined that there is no failed SSD 20 as a result of the determination (Step S74: no), the storage controller 10 ends the drive maintenance necessity precheck processing. In a case where it is determined that there is the failed SSD 20 (Step S74: yes), on the other hand, the storage controller 10 notifies the management apparatus 3 and/or the management apparatus 7 of the number and model number of the failed SSDs 20 (Step S75), and ends the drive maintenance necessity precheck processing. With this, the maintenance personnel can appropriately be notified of also the number of failed SSDs to be replaced, so that the necessary number of the SSDs 20 taking failed SSD replacement into consideration can be added on the next maintenance date. Note that, a notice regarding the number of the failed SSDs 20 may be given before the next scheduled maintenance date in this way when the number of the failed SSDs 20 to be replaced is smaller than the number of failed SSDs whose data is recoverable in the PG 50 (that is, PG redundancy) (for example, a case where a single SSD of a PG including a RAID 6 having a redundancy of 2 has failed; specifically, a case where the PG has lowered redundancy that is not zero and can handle additional failed SSDs), and when the number of the failed SSDs 20 is equal to the number of failed SSDs whose data is recoverable in the PG 50, a notice regarding a request for the immediate maintenance of the SSD 20 of the storage apparatus 1 may be given.

Next, the drive failure prevention/recovery processing (Step S80) is described in detail.

Figure 16:
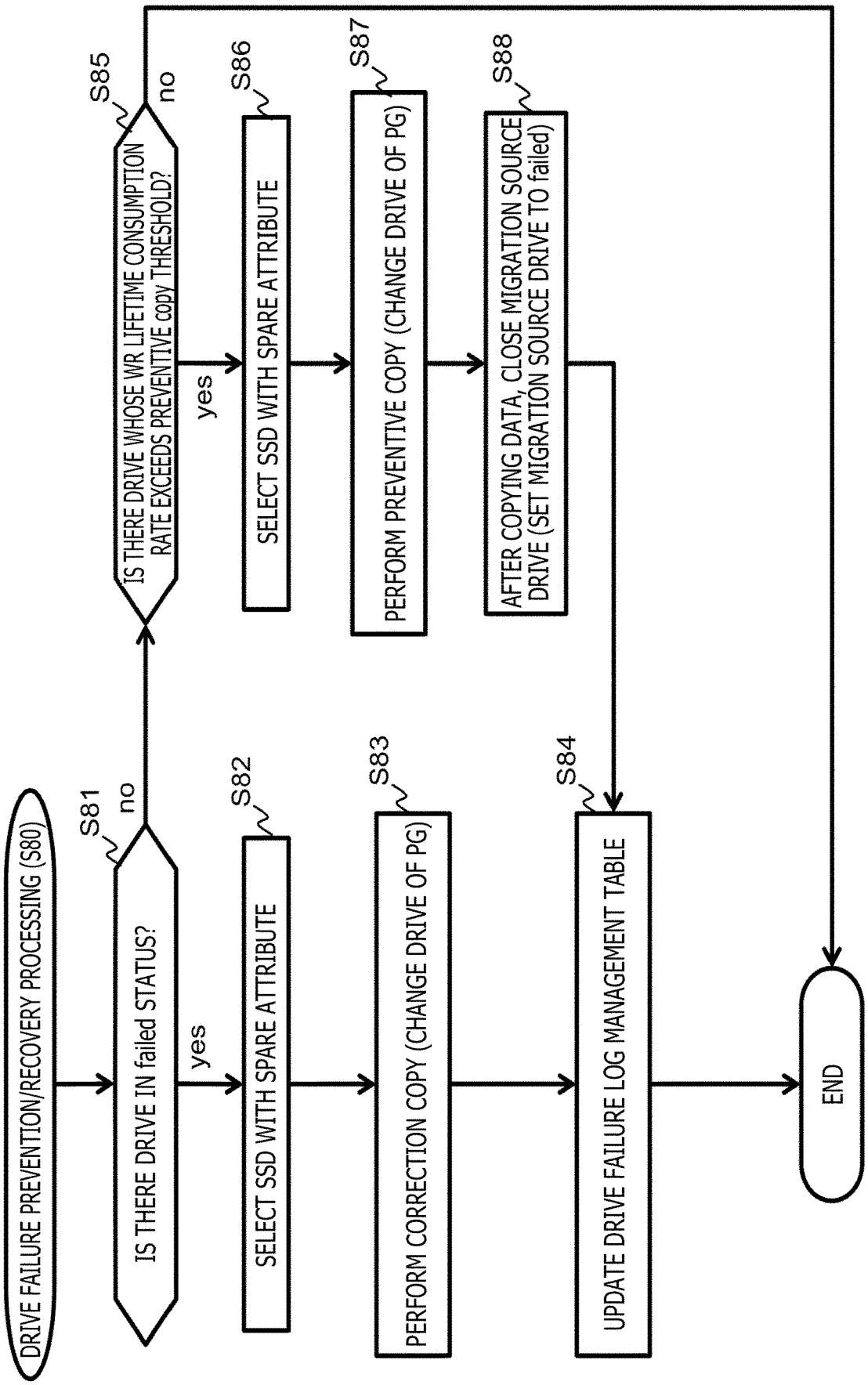
FIG. 16 is a flowchart of drive failure prevention/recovery processing according to the first embodiment.

FIG. 16 is a flowchart of the drive failure prevention/recovery processing according to the first embodiment.

The storage controller 10 refers to the drive management table 500 to determine whether there is the failed data/parity SSD 20 or not (Step S81).

In a case where it is determined that there is the failed SSD 20 as a result of the determination (Step S81: yes), the storage controller 10 selects the SSD 20 with the spare attribute as the replacement of the failed SSD 20 (Step S82). Next, the storage controller 10 performs correction copy of recovering the data in the failed SSD 20 with use of the parity and copying the data to the SSD 20 for replacement, and sets the SSD 20 for replacement to the pool management table 300 and the like as the drive of the PG 50 in place of the failed SSD 20 (Step S83). Next, the storage controller 10 adds the failure log to the drive failure log management table 700 (Step S84), and ends the processing.

In a case where it is determined that there is no failed SSD 20 (Step S81: no), on the other hand, the storage controller 10 determines whether there is the SSD 20 whose WR lifetime consumption rate exceeds the preventive Copy threshold or not (Step S85).

In a case where it is determined that there is no SSD 20 whose WR lifetime consumption rate exceeds the preventive Copy threshold as a result of the determination (Step S85: no), the storage controller 10 ends the drive failure prevention/recovery processing.

In a case where it is determined that there is the SSD 20 whose WR lifetime consumption rate exceeds the preventive Copy threshold, that is, there is the dying SSD 20 that needs to be replaced (Step S85: yes), on the other hand, the storage controller 10 selects the SSD 20 that needs to be replaced and the SSD 20 for replacement with the spare attribute (Step S86). Next, the storage controller 10 performs preventive copy of copying the data in the SSD 20 that needs to be replaced, to the SSD 20 for replacement, and sets the SSD 20 for replacement to the pool management table 300 and the like as the drive of the PG 50 in place of the SSD 20 that needs to be replaced (Step S87). After copying the data, the storage controller 10 closes the failed SSD 20 that needs to be replaced (Step S88), and advances the processing to Step S84.

With the drive failure prevention/recovery processing, the data in the failed SSD 20 or the dying SSD 20 that needs to be replaced is appropriately copied to the SSD 20 with the spare attribute, and the SSD 20 for replacement can appropriately be set.

Next, a maintenance method for the maintenance personnel/storage administrator who performs maintenance on the storage apparatus 1 is described in detail.

Figure 17:
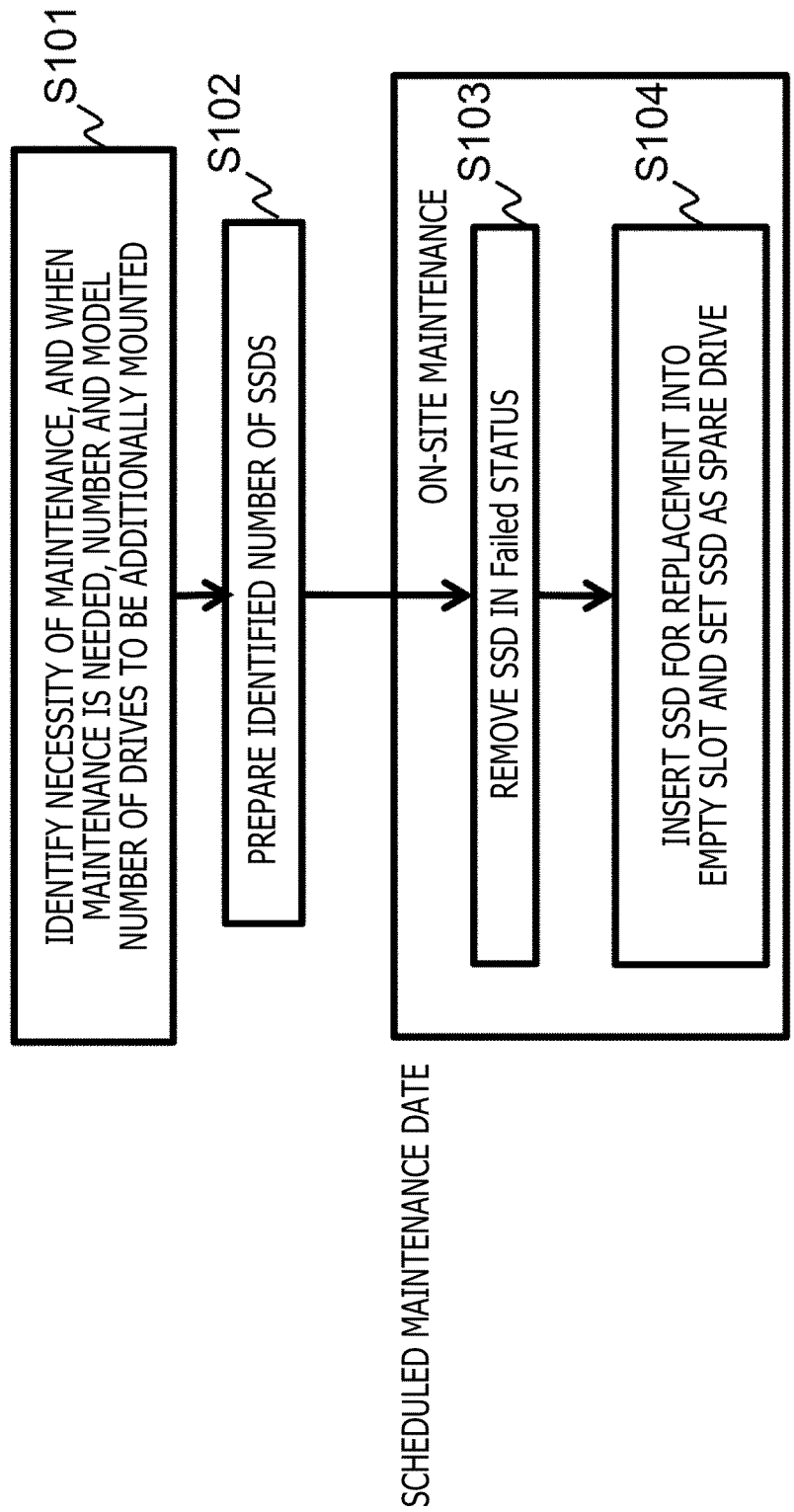
FIG. 17 is a diagram illustrating a maintenance method for maintenance personnel/storage administrator according to the first embodiment.

FIG. 17 is a diagram illustrating the maintenance method for the maintenance personnel/storage administrator (sometimes simply referred to as "maintenance personnel") according to the first embodiment.

The maintenance personnel identify, before the next scheduled maintenance date, from the management apparatus 3 or 7 having received a notification from the storage apparatus 1 through the drive maintenance necessity precheck processing, information regarding the necessity of the maintenance of the storage apparatus 1, and when the maintenance is needed, information regarding the number and model number of the SSDs 20 to be additionally mounted (Step S101). Next, the maintenance personnel prepare the identified number of the SSDs 20 in the identified model number (Step S102). With this, before visiting the actual place to perform the maintenance, the maintenance personnel can identify the number of the SSDs 20 that need to be replaced and appropriately prepare the SSDs 20.

Next, on the scheduled maintenance date, the maintenance personnel visit the actual place. The maintenance personnel remove the failed SSD 20 of the storage apparatus 1 (Step S103), insert the prepared number of SSDs 20 for replacement into the empty slot of the storage apparatus 1, and sets the SSD 20 mounted in the storage apparatus 1 as a spare drive (Step S104). With this, the maintenance personnel finish the maintenance.

After the maintenance has been finished in this way, the storage controller 10 of the storage apparatus 1 can appropriately replace, in the drive failure prevention/recovery processing that is executed thereafter, the dying SSD 20 that needs to be replaced, with the added spare SSD, before the next scheduled maintenance date (original scheduled maintenance date after next), with the result that the maintenance personnel can remove the replaced dying SSD 20 on the original scheduled maintenance date after next.

With the storage apparatus 1 described above, maintenance is performed on the scheduled maintenance dates determined in advance, so that the occurrence of unexpected maintenance can be reduced, and the processing efficiency of maintenance can thus be enhanced.

Next, a storage apparatus according to a second embodiment is described.

The storage apparatus according to the second embodiment is similar to the storage apparatus 1 according to the first embodiment in terms of hardware configuration and some processing. Thus, the storage apparatus according to the second embodiment is described using similar reference symbols for parts similar to those of the storage apparatus 1 according to the first embodiment, and is described in terms mainly of points different from the storage apparatus 1 according to the first embodiment.

Figure 18:
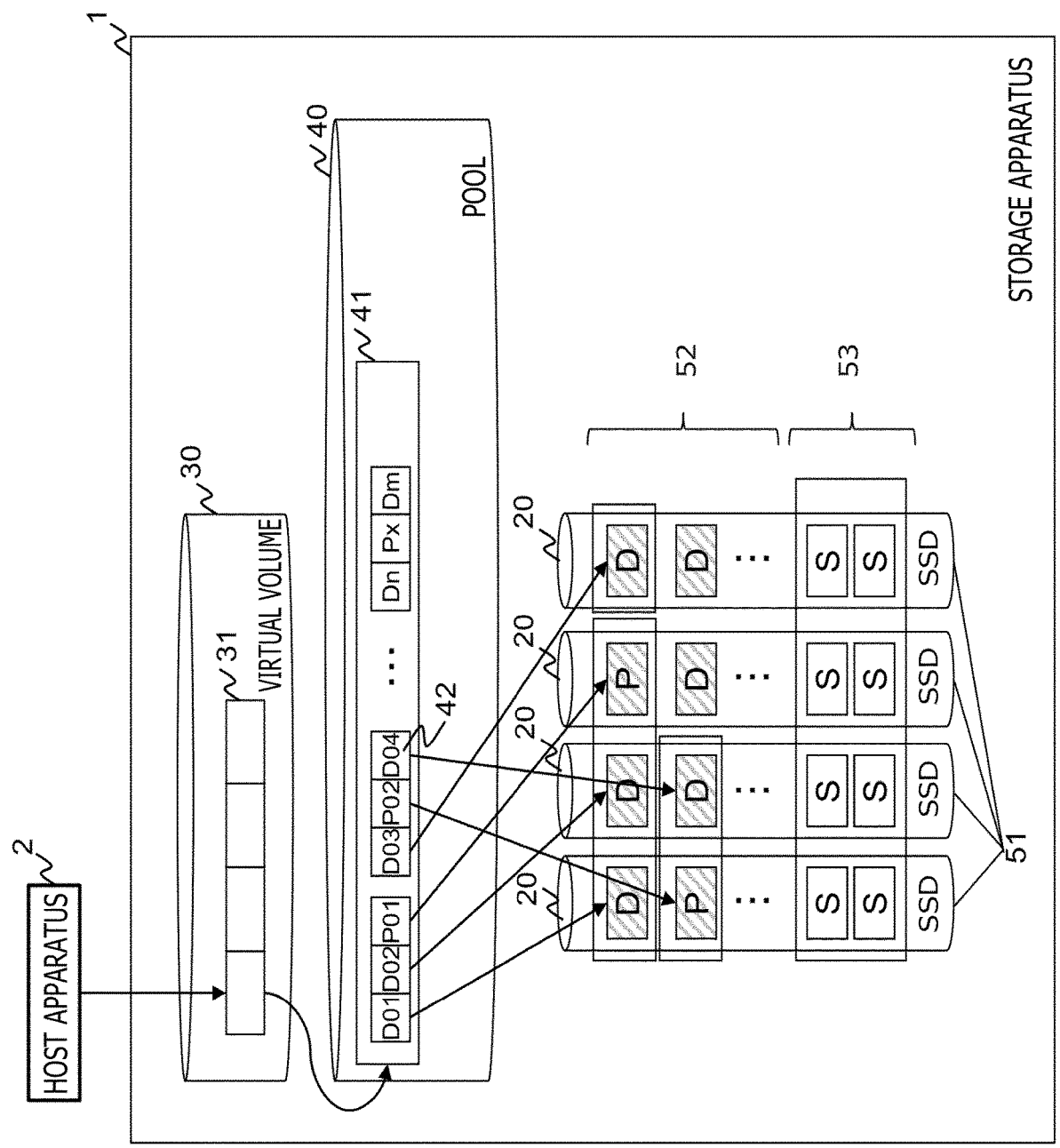
FIG. 18 is a configuration diagram of a volume that is managed by a storage apparatus according to a second embodiment.

FIG. 18 is a configuration diagram of a volume that is managed by the storage apparatus according to the second embodiment.

The storage apparatus 1 includes one or more parity groups (PGs) 51 each including the plurality of SSDs 20 for data redundancy. The PG 51 has the configuration of a distributed spare system, that is, a data/parity area 52 for storing data and parity and a spare area 53. The spare area 53 is provided to each of the SSDs 20 of the PG 51. In the example of FIG. 18, the PG 51 has the 2D1P+1S configuration including the four SSDs 20. Note that, the storage apparatus 1 also includes the spare SSDs 20 used as a spare not belonging to the PG 51.

Next, the pool management table 300 according to the second embodiment is described.

FIG. 19 is a configuration diagram of the pool management table according to the second embodiment.

The pool management table 300 according to the second embodiment has the same configuration as the pool management table 300 according to the first embodiment, but is different from the pool management table 300 according to the first embodiment in some information stored in the fields.

In the pool management table 300 according to the second embodiment, the extent 41 corresponding to the spare area 53 is managed. In the PG configuration 303 corresponding to the PG 51 having the spare area 53, a PG configuration indicating the distributed spare system, for example, 2D1P+1S, is stored. Further, in the Entry #304 of the extent 41, the number of the spare entry 42 included in the extent 41 corresponding to the spare area 53 is also stored.

Figure 20:
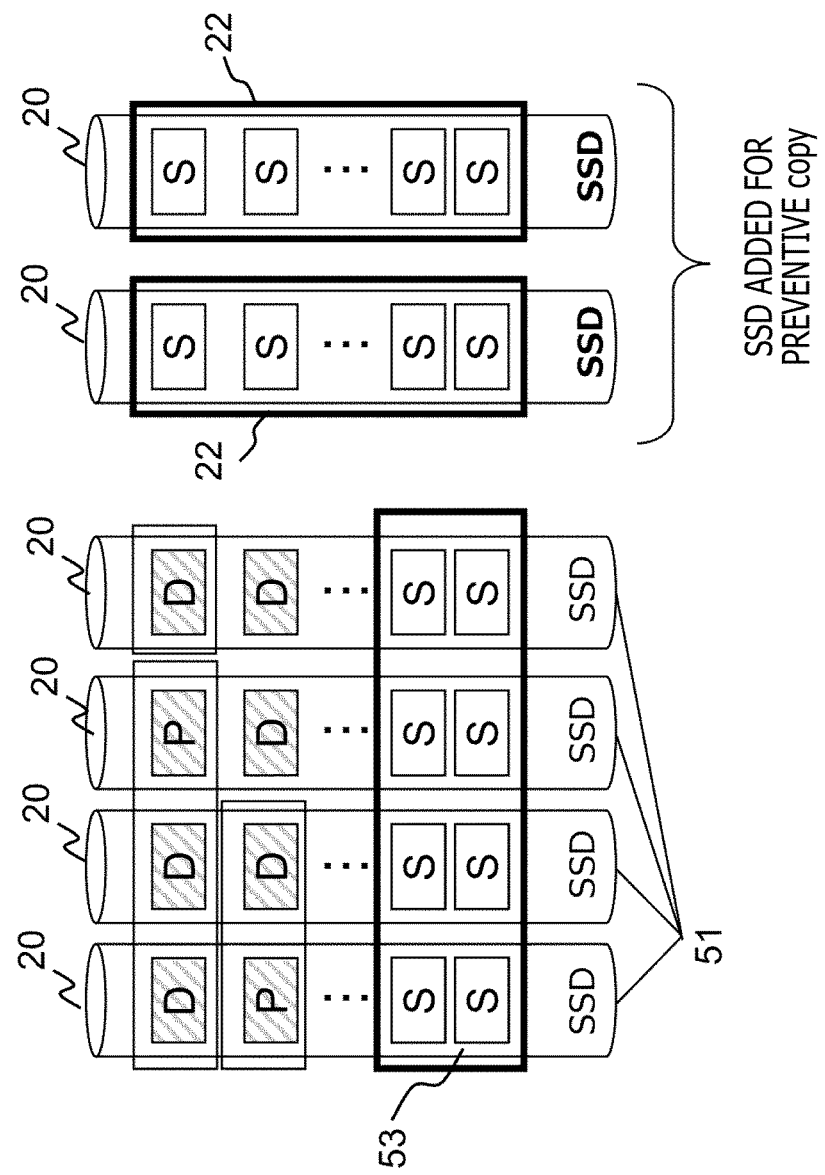
FIG. 20 is a configuration diagram of drives in the storage apparatus according to the second embodiment.

FIG. 20 is a configuration diagram of drives in the storage apparatus according to the second embodiment. FIG. 20 illustrates a state where the storage apparatus 1 has added thereto the SSDs 20 for dying SSD replacement, that is, the SSDs 20 for preventive copy.

When the SSD 20 for dying SSD replacement is incorporated in the PG 51, the spare area 53 of the PG 51 is expanded, so that the data in the PG 51 is relocated. Thus, in the present embodiment, the SSD 20 for dying SSD replacement is not incorporated in the PG 51, so that the entire storage area serves as a dedicated spare area. As a result, in the storage apparatus 1, the spare area 53 of the SSD 20 in the PG 51 (distributed spare area) and a spare area 22 of the SSD 20 for dying SSD replacement (dedicated spare area) exist.

Next, usage examples of the spare areas of the SSDs 20 (distributed spare area and dedicated spare area) in the storage apparatus 1 are described.

Figure 21B:
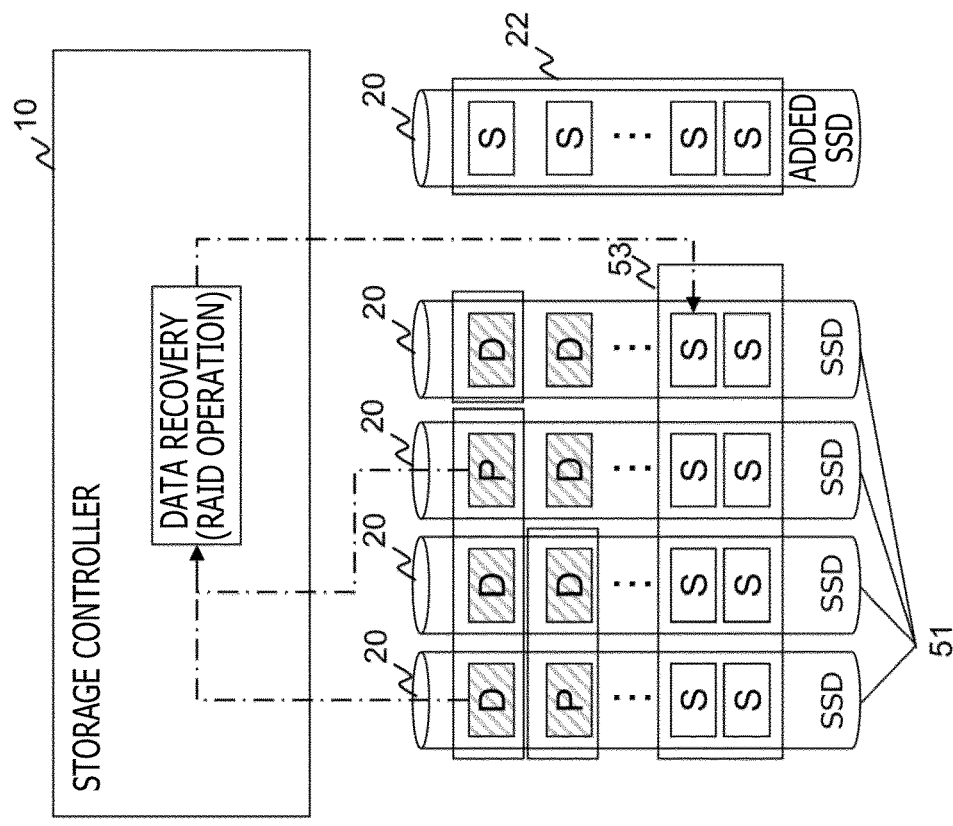
FIGS. 21A-21B are diagrams illustrating usage examples of spare areas according to the second embodiment.
Figure 21A:
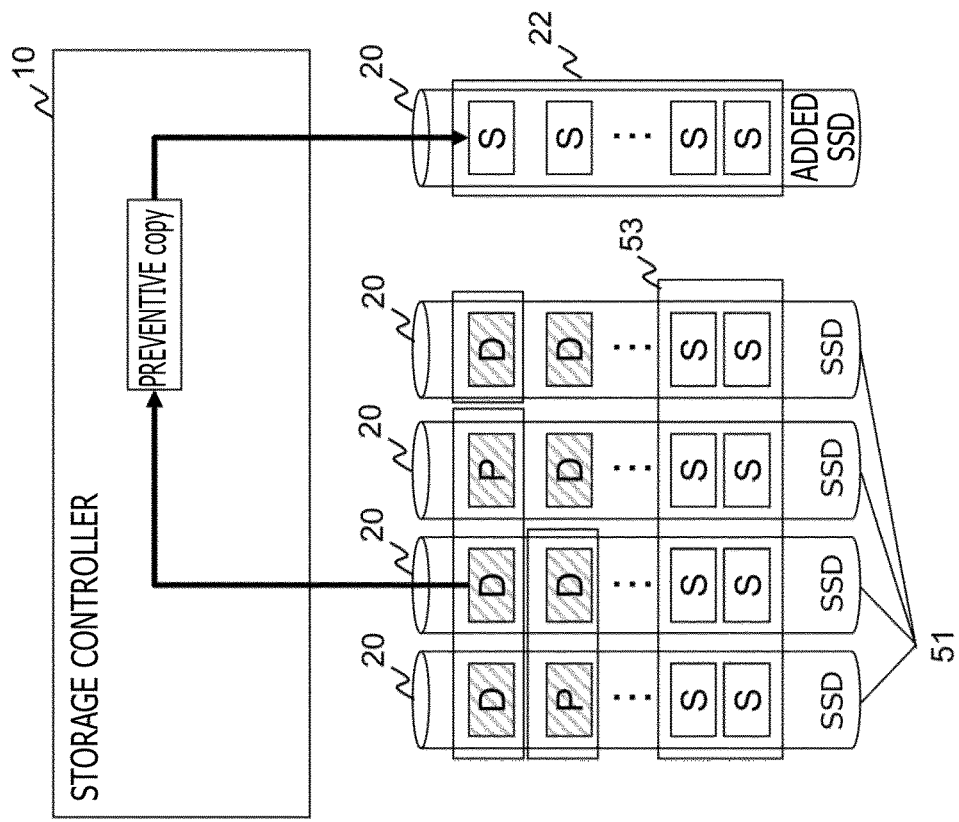

FIG. 21 is a diagram illustrating the usage examples of the spare areas according to the second embodiment. FIG. 21(A) illustrates a usage example in preventive copy, and FIG. 21(B) illustrates a usage example in correction copy.

The storage apparatus 1 copies, in preventive copy, that is, when the SSD 20 (for example, the second SSD 20 from the left in FIG. 21(A)) is dying, as illustrated in FIG. 21(A), the data in the dying SSD 20 to the dedicated spare area 22 of the added SSD 20 for dying SSD replacement.

Meanwhile, in correction copy, that is, when a failure such as an unexpected failure occurs in the SSD 20 (the second SSD 20 from the left in FIG. 21(B)), as illustrated in FIG. 21(B), the data in the failed SSD 20 is recovered with the use of the data and parity in the other SSDs 20 of the PG 51 and copied to the distributed spare area 53 of the SSD 20 of the PG 51 not storing the corrupted data and the parity thereof (the right most SSD 20 of the PG 51 in this example). With this, the recovered data is distributed to the plurality of SSDs 20 of the PG 51. The recovered data is distributed in this way, so that there is provided an effect that, when correction copy (correction read) is needed thereafter, for example, the processing can be performed by reading necessary data and parity from the different SSDs 20 in parallel and the processing time can thus be shortened.

Next, the main processing of the storage apparatus 1 according to the second embodiment is described.

Figure 22:
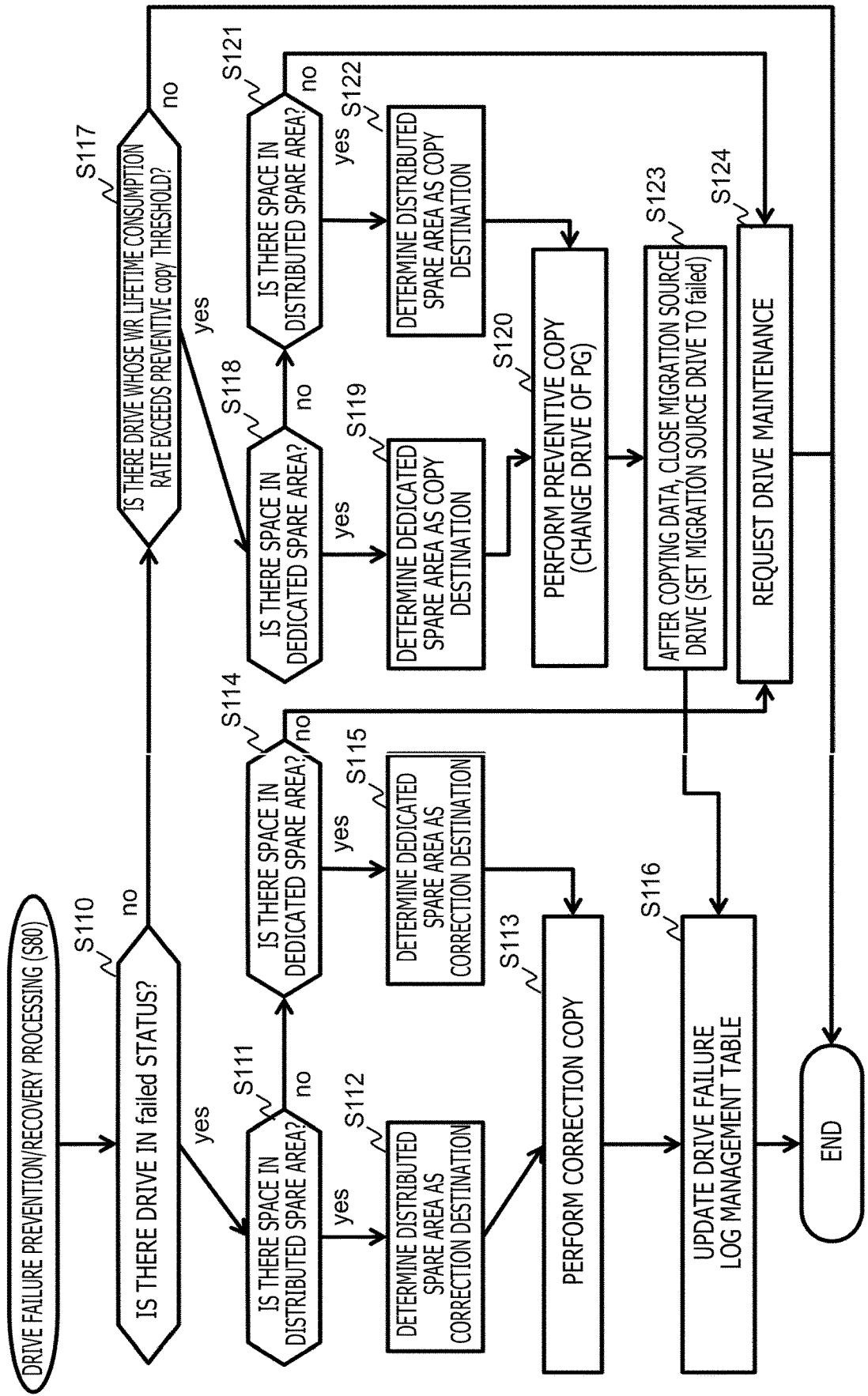
FIG. 22 is a flowchart of drive failure prevention/recovery processing according to the second embodiment.
Figure 23:
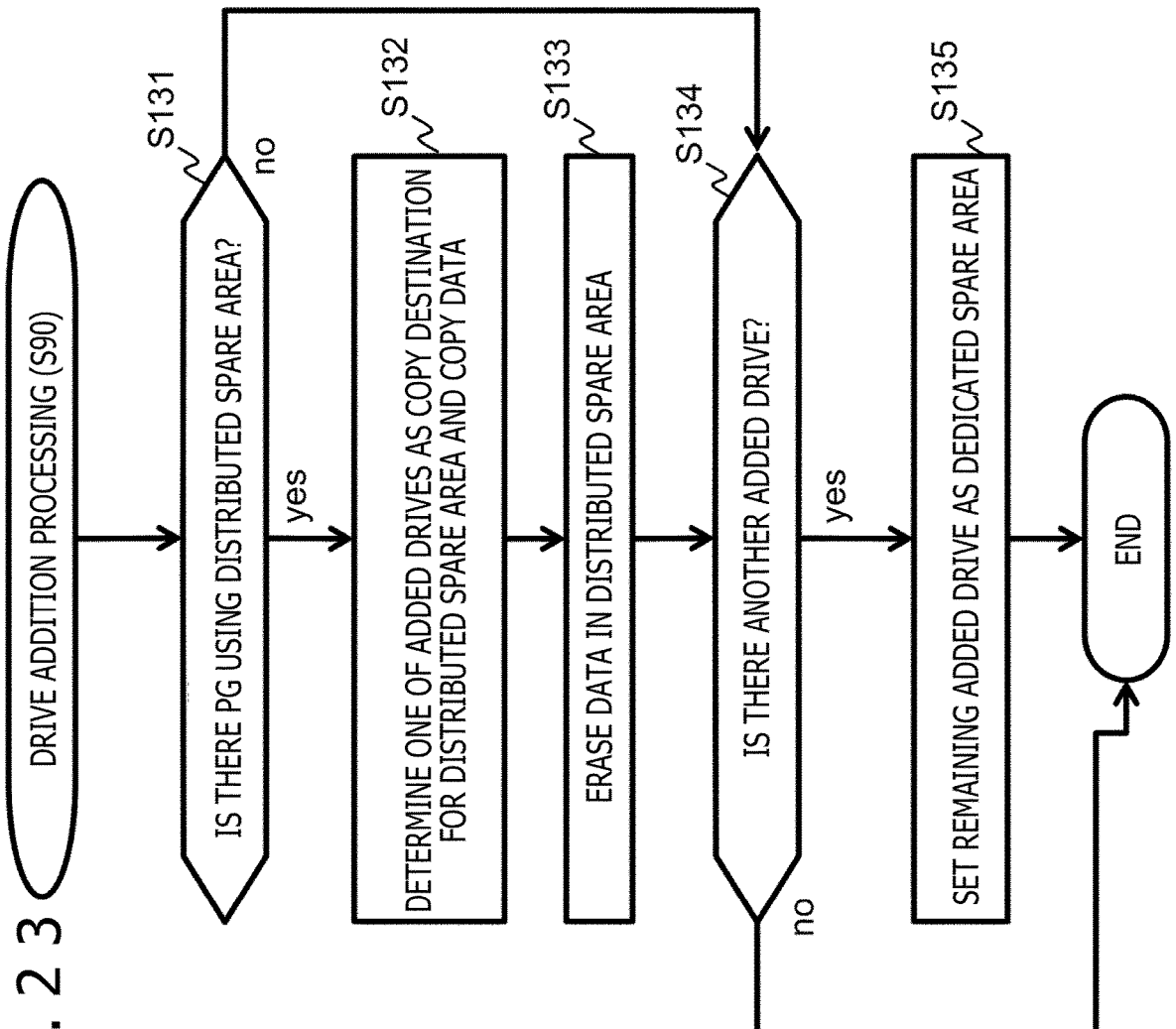
FIG. 23 is a flowchart of drive addition processing according to the second embodiment.

The overall flow of the main processing of the storage apparatus 1 according to the second embodiment is similar to that of the main processing according to the first embodiment illustrated in FIG. 13. In Step S80, instead of the drive failure prevention/recovery processing illustrated in FIG. 16, drive failure prevention/recovery processing illustrated in FIG. 22 is executed. In Step S90, drive addition processing illustrated in FIG. 23 is executed.

Next, the drive failure prevention/recovery processing according to the second embodiment is described.

FIG. 22 is a flowchart of the drive failure prevention/recovery processing according to the second embodiment.

The storage controller 10 refers to the drive management table 500 to determine whether there is the failed data/parity SSD 20 or not (Step S110).

In a case where it is determined that there is the failed SSD 20 as a result of the determination (Step S110: yes), the storage controller 10 determines whether there is space in the distributed spare area 53 or not to perform correction copy of copying the data preferentially to the distributed spare area 53 (Step S111).

In a case where it is determined that there is space in the distributed spare area 53 (Step S111: yes), the storage controller 10 determines the distributed spare area 53 as a correction destination (Step S112), and performs correction copy of recovering the data in the failed SSD 20 and copying the data to the distributed spare area 53. The storage controller 10 sets the drive and area corresponding to the distributed spare area 53 to the pool management table 300 and the like in place of the drive and area (Drive #306, Offset 307, and Size 308) corresponding to each entry of the failed SSD 20 (Step S113), and advances the processing to Step S116.

In a case where it is determined that there is no space in the distributed spare area 53 (Step S111: no), on the other hand, the storage controller 10 determines whether there is space in the dedicated spare area 22 or not (Step S114).

In a case where it is determined that there is space in the dedicated spare area 22 (Step S114: yes), the storage controller 10 determines the dedicated spare area 22 as a correction destination (Step S115), and performs correction copy of recovering the data in the failed SSD 20 and copying the data to the dedicated spare area 22. The storage controller 10 sets the drive and area corresponding to the dedicated spare area 22 to the pool management table 300 and the like in place of the drive and area (Drive #306, Offset 307, and Size 308) corresponding to each entry of the failed SSD 20 (Step S113), and advances the processing to Step S116.

In step S116, the storage controller 10 adds the failure log to the drive failure log management table 700, and ends the processing.

In a case where it is determined that there is no space in the dedicated spare area 22 (Step S114: no), on the other hand, the storage controller 10 advances the processing to Step S124.

In a case where it is determined that there is no failed SSD 20 in step S110 (Step S110: no), the storage controller 10 determines whether there is the SSD 20 whose WR lifetime consumption rate exceeds the preventive Copy threshold or not (Step S117).

In a case where it is determined that there is no SSD 20 whose WR lifetime consumption rate exceeds the preventive Copy threshold as a result of the determination (Step S117: no), the storage controller 10 ends the processing.

In a case where it is determined that there is the SSD 20 whose WR lifetime consumption rate exceeds the preventive Copy threshold, that is, there is the dying SSD 20 that needs to be replaced (Step S117: yes), on the other hand, the storage controller 10 determines whether there is space in the dedicated spare area 22 or not to perform preventive copy of copying the data preferentially to the dedicated spare area 22 (Step S118).

In a case where it is determined that there is space in the dedicated spare area 22 (Step S118: yes), the storage controller 10 determines the dedicated spare area 22 as a copy destination (Step S119), and performs preventive copy of copying the data in the SSD 20 that needs to be replaced, to the dedicated spare area 22. The storage controller 10 sets the SSD 20 for replacement to the pool management table 300 and the like as the drive of the PG 51 in place of the SSD 20 that needs to be replaced (Step S120). After copying the data, the storage controller 10 closes the failed SSD 20 that needed to be replaced (Step S123), and advances the processing to Step S116.

In a case where it is determined that there is no space in the dedicated spare area 22 (Step S118: no), on the other hand, the storage controller 10 determines whether there is space in the distributed spare area 53 or not (Step S121).

In a case where it is determined that there is space in the distributed spare area 53 (Step S121: yes), the storage controller 10 determines the distributed spare area 53 as a copy destination (Step S122), and performs preventive copy of coping the data in the SSD 20 that needs to be replaced, to the distributed spare area 53. The storage controller 10 sets the drive and area corresponding to the distributed spare area 53 to the pool management table 300 and the like in place of the drive and area (Drive #306, Offset 307, and Size 308) corresponding to each entry of the SSD 20 that needs to be replaced (Step S120). After copying the data, the storage controller 10 closes the failed SSD 20 that needs to be replaced (Step S123), and advances the processing to Step S116.

In a case where it is determined that there is no space in the distributed spare area 53 (Step S121: no), on the other hand, the storage controller 10 advances the processing to Step S124.

In step S124, since the spare area to which the data is to be copied cannot be secured, the storage controller 10 transmits a notification requesting drive maintenance to the management apparatus 3 or 7, and ends the processing.

With the drive failure prevention/recovery processing, the data in the failed SSD 20 can be copied preferentially to the distributed spare area 53, so that, in the subsequent processing, the data can be read in parallel, and can be quickly read when correction read is needed. Further, with the drive failure prevention/recovery processing, the data in the dying SSD 20 that needs to be replaced can be copied preferentially to the dedicated spare area 22.

Next, the drive addition processing (Step S90) according to the second embodiment is described.

FIG. 23 is a flowchart of the drive addition processing according to the second embodiment.

The storage controller 10 determines whether there is the PG 51 using the distributed spare area 53 or not (Step S131). In a case where it is determined that there is no PG 51 using the distributed spare area 53 (Step S131: no), the storage controller 10 advances the processing to Step S134.

In a case where it is determined that there is the PG 51 using the distributed spare area 53 (Step S131: yes), on the other hand, the storage controller 10 determines one of the added drives as the copy destination for the data in the distributed spare area 53, and copies the data in the distributed spare area 53. The storage controller 10 sets the SSD 20 for replacement to the pool management table 300 and the like as the drive of the PG 51 in place of the SSD 20 that needs to be replaced (Step S132). After coping the data, the storage controller 10 erases the data in the distributed spare area 53 of the PG 51 (Step S133), and advances the processing to Step S134.

In step S134, the storage controller 10 determines whether there is the added SSD 20 other than the SSD 20 used in Step S132 or not (Step S134). In a case where it is determined that there is no added SSD 20 other than the used SSD 20 as a result of the determination (Step S134: no), the storage controller 10 ends the processing. In a case where it is determined that there is the added SSD 20 other than the used SSD 20 (Step S134: yes), on the other hand, the storage controller 10 determines the remaining SSD 20 as the dedicated spare area 22, to set the remaining SSD 20 to the drive management table 500 and the like (Step S135), and ends the processing.

Note that, the present invention is not limited to the embodiments described above, and can be appropriately modified without departing from the gist of the present invention.

For example, in the embodiments described above, in the case where the WR lifetime consumption rate exceeds the preventive Copy threshold, the SSD 20 to be replaced is subjected to preventive copy of copying the data in the SSD 20 that needs to be replaced, but the present invention is not limited thereto. For example, with regard to the SSD 20 determined to be replaced, even when the WR lifetime consumption rate does not exceed the preventive Copy threshold, preventive copy may forcibly be started at a time point that allows preventive copy to be completed in time before the scheduled maintenance date after next. For example, time required for preventive copy may be estimated on the basis of the used capacity of the SSD 20 that needs to be replaced, and preventive copy may be started at a time point preceding the scheduled maintenance date after next by at least the required time.

Further, in the embodiments described above, whole or some of the processing that is performed by the CPU may be performed by a hardware circuit. Further, the program of the embodiments described above may be installed from a program source. The program source may be a program distribution server or a storage medium (for example, portable storage medium).

What is claimed is:

1. A storage apparatus comprising:
   a plurality of flash drives; and
   a processor,
   wherein the processor is configured to:
   specify, based on lifetimes of the flash drives depending on amounts of data written to the flash drives, a flash drive of the flash drives to be replaced on a first scheduled maintenance date;
   give notice of the flash drive specified to be replaced;
   copy data in the flash drive to be replaced to another an added flash drive by the first scheduled maintenance date on which the replacement is to be performed;
   prior to the first scheduled maintenance date, specify an other flash drive of the flash drives that is to be subjected to replacement on a second scheduled maintenance date after the first scheduled maintenance date, and then give notice of the other flash drive by the first scheduled maintenance date; and
   copy data in the other flash drive to be replaced on the second scheduled maintenance date to the added flash drive added to the storage apparatus on the first scheduled maintenance date, before the second scheduled maintenance date, and replace the other flash drive to be replaced, with the added flash drive.

2. The storage apparatus according to claim 1, wherein the processor is further configured to start copying the data in the other flash drive to the added flash drive when a lifetime consumption rate of the other flash drive that is based on an amount of written data exceeds a predetermined threshold.

3. The storage apparatus according to claim 2, wherein the copy of the data in the other flash drive to the added flash drive is forcibly started by a predetermined time point that allows the copy of the data in the other flash drive to the added flash drive to be completed in time before the second scheduled maintenance date.

4. The storage apparatus according to claim 1, wherein the plurality of flash drives include a flash drive of a parity group and a spare dedicated flash drive,
wherein a part of a storage area of the flash drive of the parity group is set as a spare area, and
wherein the processor is configured to:
preferentially use the spare dedicated flash drive to copy the data in the flash drive to be replaced; and
preferentially use the spare area of the flash drive of the parity group to recover and copy data managed in the parity group.

5. The storage apparatus according to claim 1, wherein the plurality of flash drives form a parity group, and
wherein the processor is further configured to detect a failure in the flash drives, and to give notice of, when a number of the flash drives having the failure is smaller than a number of failed flash drives whose data is recoverable in the parity group, a projected number of flash drives that need to be replaced based on the lifetime and the number of the flash drives having the failure, before a next scheduled maintenance date of the storage apparatus, without giving notice of a request for maintenance of the storage apparatus.

6. A maintenance support method for a storage apparatus including a plurality of flash drives and a processor,
the maintenance support method comprising:
specifying, based on lifetimes of the flash drives depending on amounts of data written to the flash drives, a flash drive of the flash drives to be replaced on a first scheduled maintenance date;
giving notice of the flash drive specified to be replaced;
copying data in the flash drive to be replaced to an added flash drive by the first scheduled maintenance date on which the replacement is to be performed;
prior to the first maintenance date, specifying an other flash drive of the flash drives that is to be subjected to replacement on a second scheduled maintenance date after the first scheduled maintenance date, and then giving notice of the other flash drive by the first scheduled maintenance date; and
copying data in the other flash drive to be replaced on the second scheduled maintenance date to the added flash drive added to the storage apparatus on the first scheduled maintenance date, before the second scheduled maintenance date, and replacing the other flash drive to be replaced, with the added flash drive.

7. The maintenance support method according to claim 6, wherein the plurality of flash drives include a flash drive of a parity group and a spare dedicated flash drive,
wherein a part of a storage area of the flash drive of the parity group is set as a spare area,
wherein the spare dedicated flash drive is preferentially used to copy the data in the flash drive to be replaced, and
wherein the spare area of the flash drive of the parity group is preferentially used to recover and copy data managed in the parity group.

8. A non-transitory machine-readable storage medium encoded with a maintenance support program that is executed by a computer forming a storage apparatus including a plurality of flash drives and a processor,
the maintenance support program causing the computer to:
specify, based on lifetimes of the flash drives depending on amounts of data written to the flash drives, a flash drive of the flash drives to be replaced on a first scheduled maintenance date;
give notice of the flash drive specified to be replaced;
copy data in the flash drive to be replaced to an added flash drive by the first scheduled maintenance date on which the replacement is to be performed;
prior to the first scheduled maintenance date, specify an other flash drive of the flash drives that is to be subjected to replacement on a second scheduled maintenance date after the first scheduled maintenance date, and then give notice of the other flash drive by the first scheduled maintenance date; and
copy data in the other flash drive to be replaced on the second scheduled maintenance date to the added flash drive added to the storage apparatus on the first scheduled maintenance date, before the second scheduled maintenance date, and replace the other flash drive to be replaced, with the added flash drive.

9. The non-transitory machine-readable storage medium according to claim 8,
wherein the plurality of flash drives include a flash drive of a parity group and a spare dedicated flash drive,
wherein a part of a storage area of the flash drive of the parity group is set as a spare area, and
wherein the computer is caused to:
preferentially use the spare dedicated flash drive to copy the data in the flash drive to be replaced; and
preferentially use the spare area of the flash drive of the parity group to recover and copy data managed in the parity group.

* * * * *